United States Patent
Chiu

(10) Patent No.: US 9,532,325 B2
(45) Date of Patent: Dec. 27, 2016

(54) METHOD OF FORMING N-HOP SYNCHRONOUS NETWORK FOR D2D COMMUNICATION AND DEVICES USING THE SAME

(71) Applicant: Acer Incorporated, New Taipei (TW)

(72) Inventor: Chun-Yuan Chiu, New Taipei (TW)

(73) Assignee: Acer Incorporated, New Taipei (TW)

( * ) Notice: Subject to any disclaimer, the term of this patent is extended or adjusted under 35 U.S.C. 154(b) by 55 days.

(21) Appl. No.: 14/706,979

(22) Filed: May 8, 2015

(65) Prior Publication Data

US 2015/0327195 A1 Nov. 12, 2015

Related U.S. Application Data

(60) Provisional application No. 61/990,126, filed on May 8, 2014.

(51) Int. Cl.
*H04W 24/02* (2009.01)
*H04W 56/00* (2009.01)
(Continued)

(52) U.S. Cl.
CPC ....... *H04W 56/002* (2013.01); *H04B 7/15507* (2013.01); *H04W 72/0406* (2013.01); *H04W 76/023* (2013.01); *H04W 76/043* (2013.01)

(58) Field of Classification Search
None
See application file for complete search history.

(56) References Cited

U.S. PATENT DOCUMENTS

2009/0147714 A1 6/2009 Jain et al.
2013/0148566 A1 6/2013 Doppler et al.
(Continued)

FOREIGN PATENT DOCUMENTS

| CN | 103281769 | 9/2013 |
| CN | 103415055 | 11/2013 |
| CN | 103458498 | 12/2013 |

OTHER PUBLICATIONS

Intel Corporation, "Discussion on D2D synchronization procedure", 3GPP Draft; R1-140127, 3GPP TSG RAN WG1 Meeting #76, Prague, Czech Republic, Feb. 10-14, 2014, Retrieved from URL:http://www.3gpp.org/ftp/Meetings_3GPP_SYNC/RAN/RAN1/Docs/.

(Continued)

*Primary Examiner* — Jay P Patel
(74) *Attorney, Agent, or Firm* — Jianq Chyun IP Office

(57) ABSTRACT

The disclosure proposes a method of forming an N-hop synchronous network for D2D communication and devices using the same. In one of the exemplary embodiments, the method may include detecting one or more synchronization signals which are transmitted from one or more nearby synchronization sources; selecting, from the one or more synchronization signals, a first SS transmitted from a neighboring synchronization source having a hop count=i, wherein i is the smallest hop count detected from the one or more neighboring synchronization sources; and if there are more than one neighboring synchronization sources with hop count=i, the first SS is selected as having a maximum RSRP detected by the UE; and if the RSRP of the first SS does not exceeds a predefined threshold: operating as a synchronization source; and transmitting a SS based on the first SS.

23 Claims, 21 Drawing Sheets

(51) Int. Cl.
*H04W 72/04* (2009.01)
*H04W 76/02* (2009.01)
*H04W 76/04* (2009.01)
*H04B 7/155* (2006.01)

(56) References Cited

U.S. PATENT DOCUMENTS

| | | | |
|---|---|---|---|
| 2014/0086158 A1* | 3/2014 | Tavildar | H04L 1/1607 370/329 |
| 2015/0264588 A1* | 9/2015 | Li | H04W 56/0015 370/350 |
| 2015/0319796 A1* | 11/2015 | Lu | H04B 7/2615 370/330 |
| 2016/0219541 A1* | 7/2016 | Chatterjee | H04L 5/0032 |

OTHER PUBLICATIONS

Interdigital, "Synchronization procedures for D2D", 3GPP Draft; R1-141562, 3GPP TSG-RAN WG1 Meeting #76bis, Shenzhen, China, Mar. 31-Apr. 4, 2014, Retrieved from URL:http://www.3gpp.org/ftp/tsg_ran/WG1_RL1/TSGR1_76b/Docs/.
3GPP TSG RAN WG1 Meeting #76 R1-140127,"Discussion on D2D synchronization procedure," Intel Corporation, Prague, Czech Republic, Feb. 10-14, 2014.

* cited by examiner

METHOD OF FORMING N-HOP SYNCHRONOUS NETWORK FOR D2D COMMUNICATION AND DEVICES USING THE SAME

CROSS REFERENCE TO RELATED APPLICATION

This application claims the priority benefit of U.S. provisional application Ser. No. 61/990,126, filed on May 8, 2014. The entirety of the above-mentioned patent application is hereby incorporated by reference herein and made a part of specification.

TECHNICAL FIELD

The disclosure is directed to a method of forming an N-hop synchronous network for device-to-device (D2D) communication and devices using the same method.

BACKGROUND

D2D communication is a technology which allows a user equipment (UE) to directly communicate with an adjacent UE over licensed or unlicensed frequency bands under controls of a wireless communication system, and such technology would enable a wireless communication network to increase system spectral efficiency, to reduce transmitted powers of each terminal, and to alleviate the resource consumptions of the wireless communication network. For both commercial and public safety purposes, one of the design considerations of D2D communication could be to make D2D communication available for a UE regardless of whether the UE is within the coverage of a cellular network, partially within the coverage of a cellular network, in between the coverages of two cellular networks, and even not at all within the coverage of a cellular network. Also, potentially a very large quantity of concurrently participating UEs may need to be considered. In order to satisfy the aforementioned design considerations, an N-hop synchronous network could be utilized.

FIG. 1A illustrates network coverage without using an N-hop synchronous network. Since a base station 101 or a cluster head has a limited coverage range 102, the base station 101 or cluster head may not be able to reach a UE 103 that is situated outside of its coverage range 102. FIG. 1B illustrates a concept of an N-hop synchronous network. One of the ideas behind the N-hop synchronous network is that since it might be difficult to have one SYN source covering all UEs situated outside the network coverage, some UEs 111 could take on the task of forwarding or even independently providing time alignment and frequency synchronization information to cover UEs outside of the coverage range 102.

Before D2D communication can commence between two or more UEs, timing alignments and/or synchronizations of the UEs to a network would need to be accomplished. A UE would be able to synchronize to a network directly or indirectly by synchronizing to a D2D Synchronization Signal (D2DSS) from which timing and synchronization information could be obtained. FIG. 1C illustrates a resource pool for D2D communication. After receiving a D2DSS, a UE that is within a network coverage or outside of a network coverage would be aware of a resource pool in terms of a specific time slot and/or a frequency spectrum which may contain resources for transmitting D2D data.

FIG. 1D illustrates a hypothetical N-hop synchronous network. Such hypothetical N-hop synchronous network may include but not limited to a cluster head 141, at least one D2D Synchronization Source (SYN source) 142, and at least one normal UE with D2D capability 143. A cluster head 141 could be a base station (e.g., eNB) or a UE.

A UE 143 may synchronize to a network by receiving a D2D Synchronization Signal (D2DSS) from which a UE could be able to accomplish timing alignment and frequency synchronization. Such D2DSS could be provided by a cluster head 141 which could be a base station (e.g., eNB) or a UE. If the cluster head 141 is a base station, the D2DSS would be a primary synchronization signal (PSS) and a secondary synchronization signal (SSS) which are transmitted by the base station. Under the circumstance in which a UE cannot receive timing alignment and frequency synchronization information from a network, the UE may act as an independent cluster head 141. For the purposes of providing network coverage outside of the network coverage or near the boundary of the network coverage, a D2DSS could be transmitted or relayed by a SYN source 142 which could be another UE with D2D capability.

A SYN source 142 would scan for a first D2DSS as a reference from the cluster or from other SYN sources 142. If a first D2DSS has been detected and subsequently selected as a reference, the SYN source 142 may synchronize to the first D2DSS before it may transmit a second D2DSS which would be derived based on the first D2DSS. If no D2DSS has been detected at all, the UE may nevertheless transmit the second D2DSS without timing reference from the first D2DSS. Any SYN source 142 may re-select the D2DSS as a reference if the SYN source 142 has detected a change in the D2DSS.

In order to synchronize a large quantity of UEs situated within or outside of the network, one method could be to allow all UEs to be SYN sources. However, such method may bring about unsatisfactory consequences such as unnecessary energy consumption and D2DSS contamination. Assuming that there is no timing alignment information available for D2DSS forwarding timing, the timing difference between SYN sources because of propagation delay may result in D2DSS contamination. Therefore, the number of SYN sources would need to be reduced.

To reduce the quantity of UEs being SYN sources while keeping the large synchronization areas, a mechanism that involves using "predefined Reference Signal Receiving Power (RSRP) Threshold" could be used to reduce the number of SYN sources in conjunction with a mechanism that involves using "Cluster Head Muting" to reduce the number of cluster heads.

For "predefined Reference Signal Receiving Power (RSRP) Threshold," if a UE cannot detect other cluster heads or SYN sources, the UE would become cluster head which has hop count=0. The hop count is the number of hops from the cluster head to the SYN source. A UE would become a SYN source only if the maximum received power from neighboring SYN sources does not exceed a predefined threshold (e.g., −80 dBm/−103 dB path gain). In general a UE would become a SYN source with hop count N if the UE detects or synchronizes to a SYN source with lower hop count (N−1). For "Cluster Head Muting," when a SYN source detects two or more cluster heads, the SYN source would select one of them as synchronization source. This means that the remaining cluster heads not selected by the SYN source may mute their operations when receiving a D2DSS from the SYN source with hop count such as n=1.

FIG. 2A~2D illustrates various hypothetical scenarios involving N-hop synchronous network operating under the aforementioned first mechanism and second mechanism. The hypothetical N-hop synchronous network of FIG. 2A would include a cluster head 201 having a first power range 202 and a second power range 203. UEs (e.g., 204) within the first power range 202 would synchronize to the cluster head 201 and the maximum received power from the cluster head 201 exceeds a predefined threshold. UEs (e.g., 205) between the first power range 202 and the second power range 203 would also synchronize to the cluster head 201 and the maximum received power from the cluster head 201 does not exceed a predefined threshold. Thus these UEs (e.g., 205) would serve as a SYN source. For UEs (e.g., 206) that cannot detect other cluster heads or SYN sources, these UEs (e.g., 206) may become cluster head which has hop count=0.

Similarly, for the hypothetical N-hop network of FIG. 2B, the UE 211, it would serve as a SYN resource as the maximum detected power from the cluster head 210 is below a predefined threshold. In the hypothetical N-hop synchronous network of FIG. 2C, a situation of "Cluster Head Muting" could be leveraged, when a UE 212 serving as a SYN source detects two cluster heads 213 214. In this situation, the UE 212 would select one of the two cluster heads 213 214 as a source to synchronize itself to. Assuming that the cluster head 213 is selected, the cluster head 214 that has not been selected by the UE 212 may mute its operation when receiving a D2DSS from the UE 212 with hop count such as n=1.

However, this mechanism that involves "predefined Reference Signal Receiving Power (RSRP) Threshold" and "Cluster Head Muting" would encounter difficulties as illustrated in the hypothetical N-hop synchronous network of FIG. 2D. In such extreme case, this mechanism may cause substantial time differences due to the skewed arrangement of the cluster head and SYN sources. If a SYN source bases upon a D2DSS previously received to forward a subsequent D2DSS (i.e., no timing advance is applied for D2DSS forwarding timing), the subsequent D2DSS timing could be propagated with a delay.

For FIG. 2D, assuming that cluster head 220 initiates a D2DSS which has a propagation delay of $T_{1\_0}$ which could be zero, the SYN source 221 would receive the D2DSS with a propagation delay of $T_{1\_1}$, the SYN source 222 would receive the forwarded D2DSS with a propagation delay of $T_{1\_2}$, and the SYN source 223 would receive the forwarded D2DSS with a propagation delay of $T_{1\_3}$. This would mean that if the UE1 241 engages in D2D communication with UE2 242 as in step S250, the messages would normally be not synchronized and thus a Cyclic Prefix (CP) is needed to cover the time difference between, for example, the D2D transmitter of UE2 242 and the D2D receiver of UE1 241. In a general N-hop Synchronous Network, the length of CP shall be larger than TA+N×(TA/2), wherein N is maximum hop count of the N-hop Synchronous Network and TA is the maximum propagation delay within a D2DSS coverage. This means that, the length of CP for the scenario of FIG. 2D would substantially exceed the current CP of Long Term Evolution (LTE) and LTE-advanced (LTE-A) communication system. Therefore, a different solution could be proposed to at least avoid the aforementioned problem.

SUMMARY OF THE DISCLOSURE

Accordingly, the disclosure is directed to a method of forming an N-hop synchronous network for D2D communication and devices using the same method.

In one of the exemplary embodiments, the disclosure is directed to a method of forming an N-hop synchronous network for device to device (D2D) communication, adapted for a user equipment(UE), the method would include not limited to: detecting one or more synchronization signals which are transmitted from one or more nearby synchronization sources; selecting, from the one or more synchronization signals, a first synchronization signal (SS), wherein: the first SS is transmitted by a neighboring synchronization source which has a hop count=i, wherein the hop count is the number of hops from an eNB to the neighboring synchronization source, and i is the smallest hop count detected from the one or more neighboring synchronization sources; and if there are more than one neighboring synchronization sources with hop count=i, the first SS is selected as having a maximum reference signal received power (RSRP) detected by the UE; and if the RSRP of the first SS does not exceeds a predefined threshold: operating as a synchronization source; and transmitting a SS based on the first SS.

In one of the exemplary embodiments, the disclosure is directed to a method of forming an N-hop synchronous network for device to device (D2D) communication, adapted for a user equipment(UE), the method includes not limited to: detecting one or more synchronization signals which are transmitted from one or more nearby synchronization sources; selecting, from the one or more synchronization signals, a first synchronization signal (SS), wherein: the first SS is transmitted by a neighboring synchronization source which has a hop count=i or i+1, wherein the hop count is the number of hops from an eNB to the neighboring synchronization source, and i is the smallest hop count detected from the one or more neighboring synchronization sources; and if there are more than one neighboring synchronization sources with the hop count=i or i+1, the first SS is selected as having a maximum reference signal received power (RSRP) detected by the UE; and if the RSRP of the first SS does not exceeds a predefined threshold: operating as a synchronization source; and transmitting a SS based on the first SS.

In one of the exemplary embodiments, the disclosure is directed to a method of forming an N-hop synchronous network for device to device (D2D) communication, adapted for a user equipment(UE), the method includes not limited to: detecting one or more synchronization signals which are transmitted from one or more nearby synchronization sources; selecting, from the one or more synchronization signals, a first synchronization signal (SS), wherein: the first SS is transmitted by a neighboring synchronization source which has a hop count=i, wherein the hop count is the number of hops from an eNB to the neighboring synchronization source, and i is the smallest hop count detected from the one or more neighboring synchronization sources; and if there are more than one neighboring synchronization sources with a hop count=i, the first SS is selected as having a maximum reference signal received power (RSRP) detected by the UE; and if the RSRP of the first SS does not exceeds a predefined threshold or if a difference of the hop counts of the neighboring synchronization sources is larger than two: operating as a synchronization source; and transmitting a SS based on the first SS.

In one of the exemplary embodiments, the disclosure is directed to a method of forming an N-hop synchronous network for device to device (D2D) communication, adapted for a user equipment(UE), the method includes not limited to: detecting one or more synchronization signals which are transmitted from one or more nearby synchronization sources; selecting, from the one or more synchronization signals, a first synchronization signal (SS), wherein: the first SS is transmitted by a neighboring synchronization source which has a hop count=i, wherein the hop count is the number of hops from an eNB to the neighboring synchronization source, and i is the smallest hop count detected from the one or more neighboring synchronization sources; and if the UE can extend coverage based on location information of neighboring synchronization sources or if a difference of the hop counts of the neighboring synchronization sources is larger than two: operating as a synchronization source; and transmitting a SS based on the first SS.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
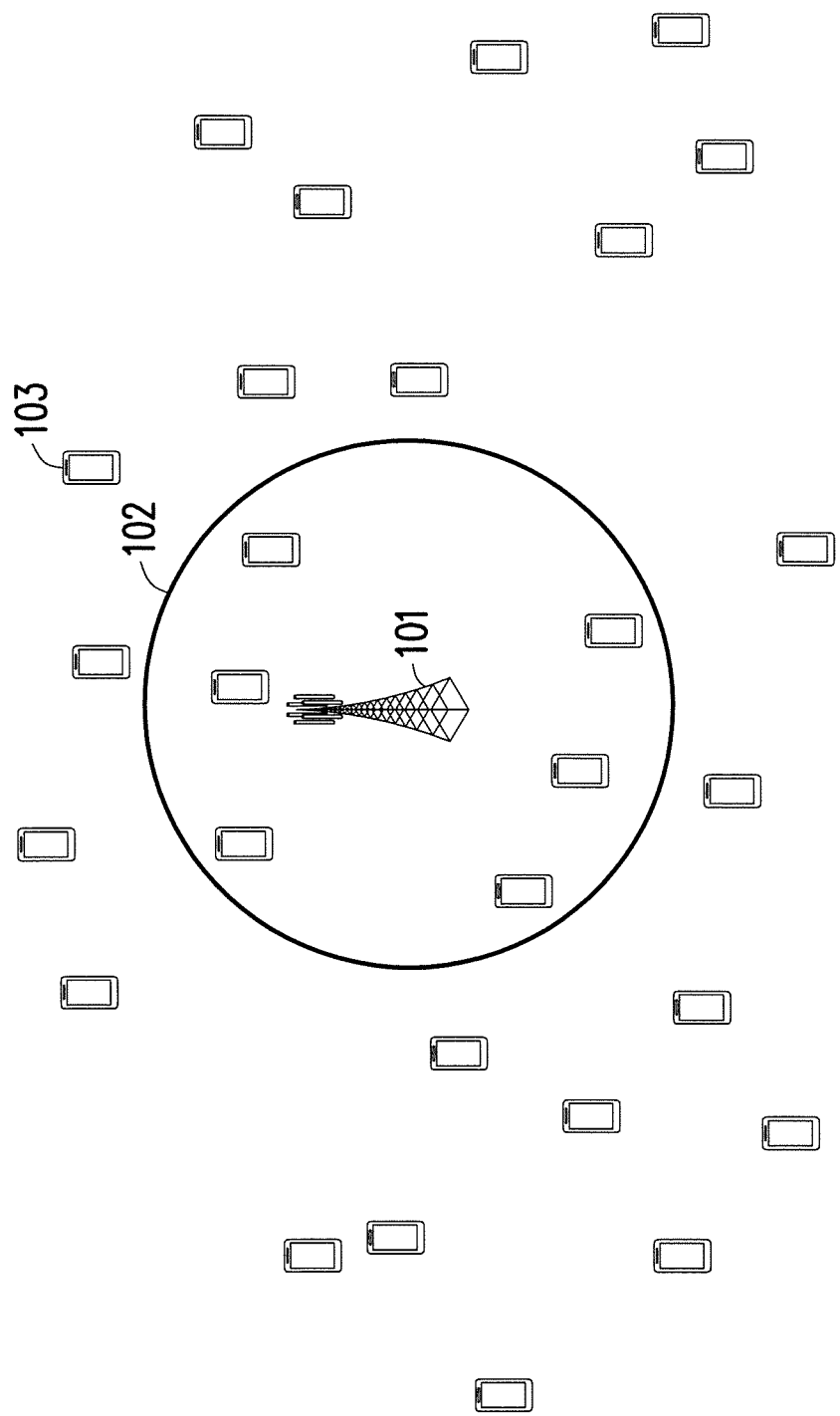
FIG. 1A illustrates network coverage without using an N-hop synchronous network.
Figure 1B:
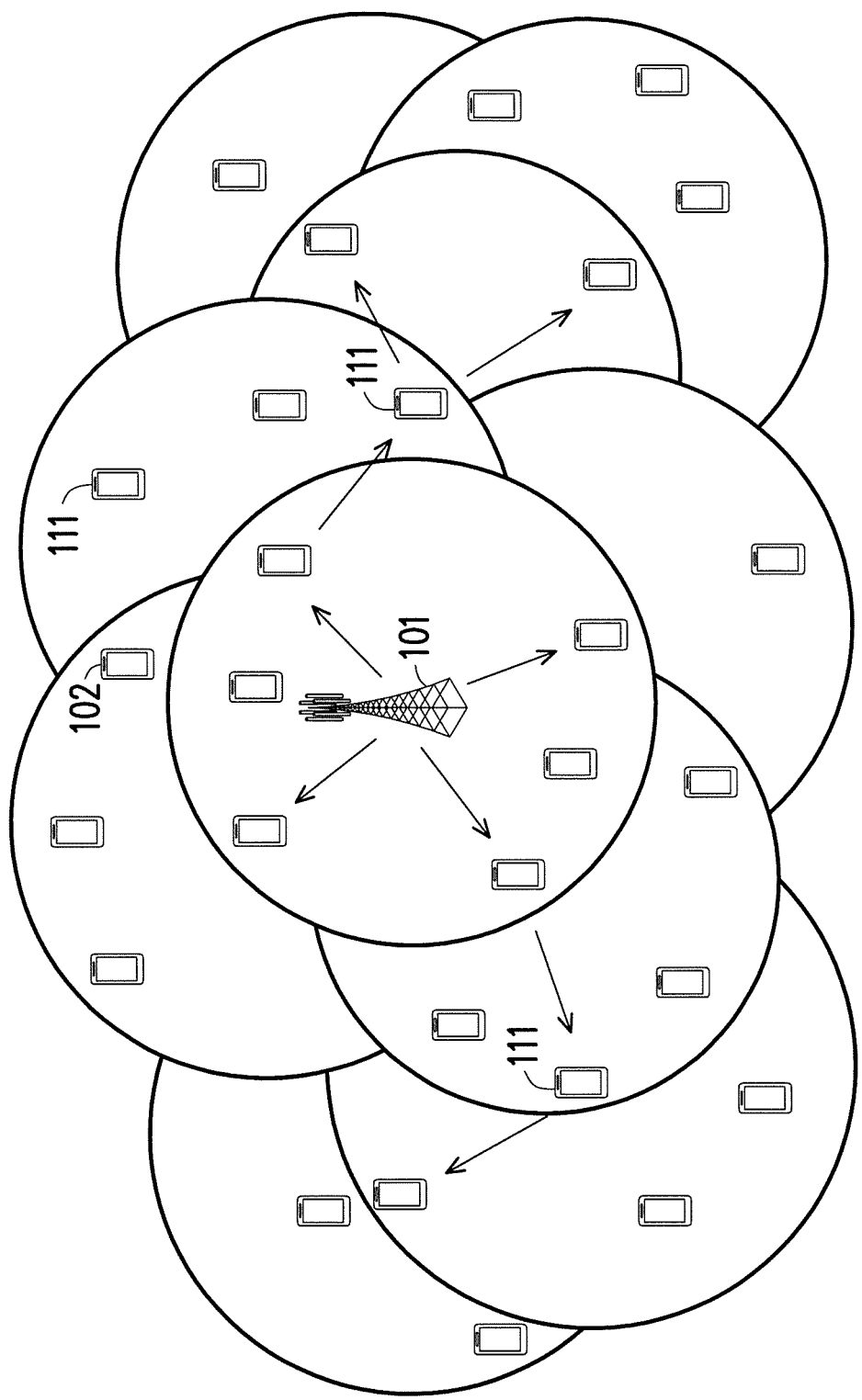
FIG. 1B illustrates a concept of an N-hop synchronous network.
Figure 1C:
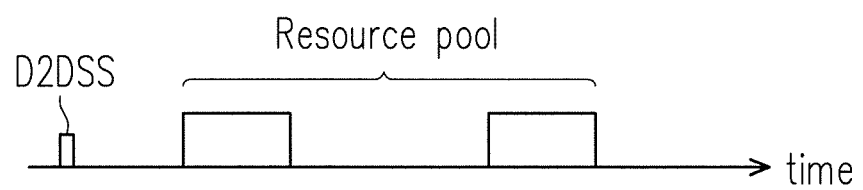
FIG. 1C illustrates a resource pool for D2D communication.
Figure 1D:
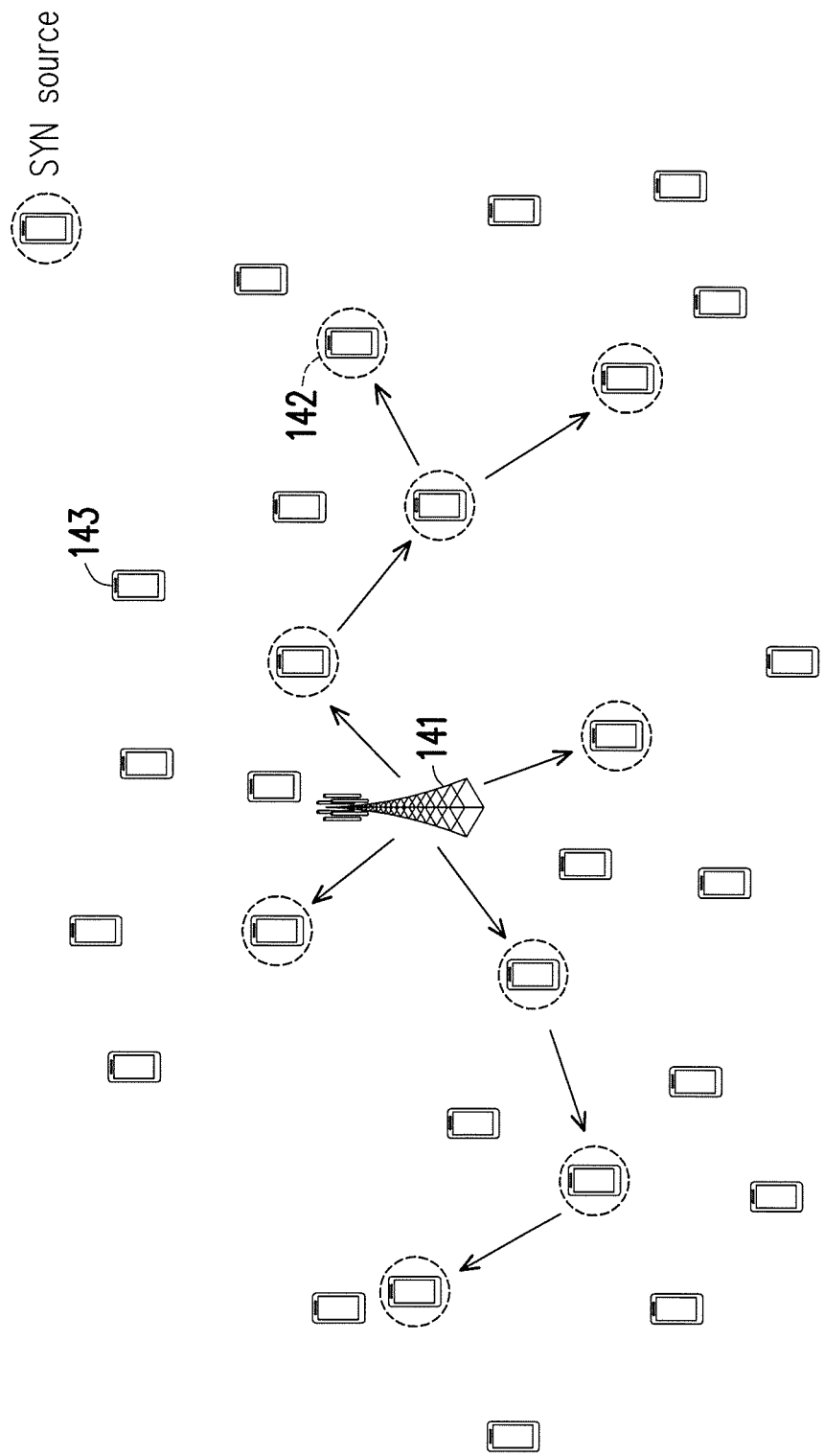
FIG. 1D illustrates a hypothetical N-hop synchronous network operating under a LTE/LTE-A communication system.

Reference will now be made in detail to the present exemplary embodiments of the disclosure, examples of which are illustrated in the accompanying drawings. Wherever possible, the same reference numbers are used in the drawings and the description to refer to the same or like parts.

In this disclosure, the aforementioned D2D synchronization concern is addressed by proposing a method of form N-hop synchronous networks for D2D communications. In the proposed method, some UEs outside network coverage may become D2D SYN sources to form N-hop synchronous networks as these SYN sources would broadcast D2D Synchronization Signal (D2DSS) periodically. By utilizing D2DSS, a UE with D2D capability would be able to synchronize with adjacent UEs and subsequently perform D2D communications with these UEs.

Figure 3A:
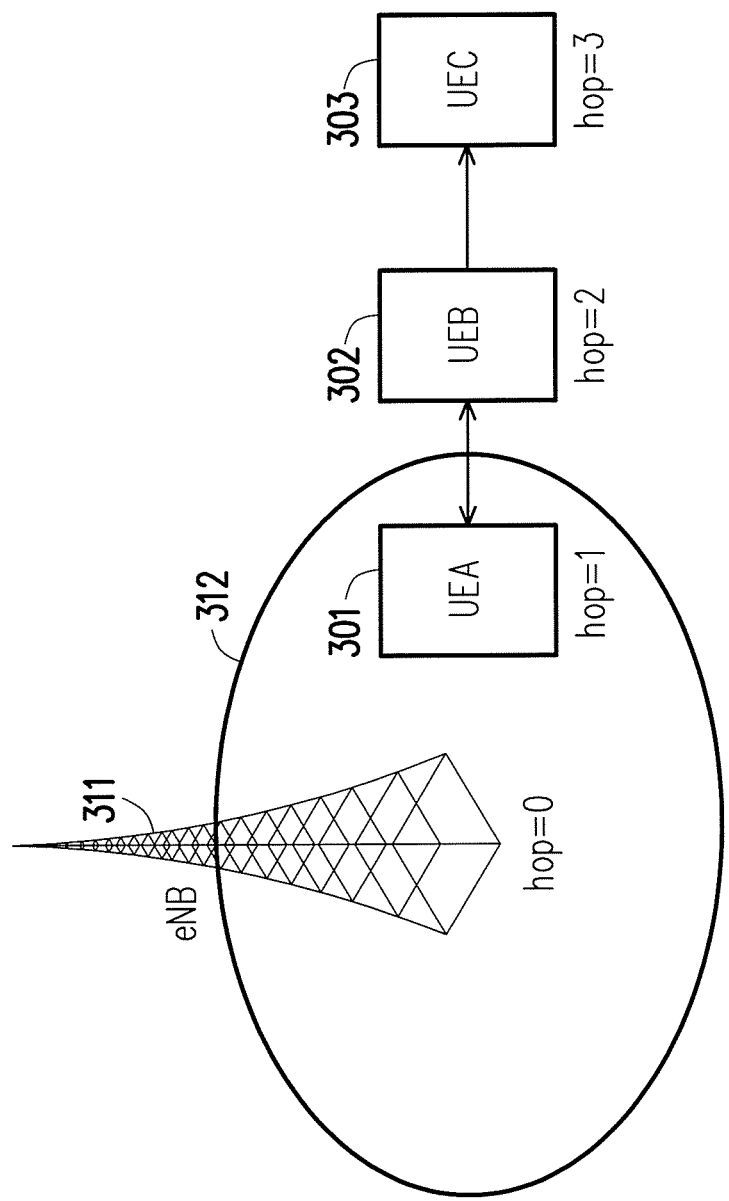
FIG. 3A illustrates an example of an N-hop synchronous network based on the first exemplary embodiment of the disclosure.
Figure 3B:
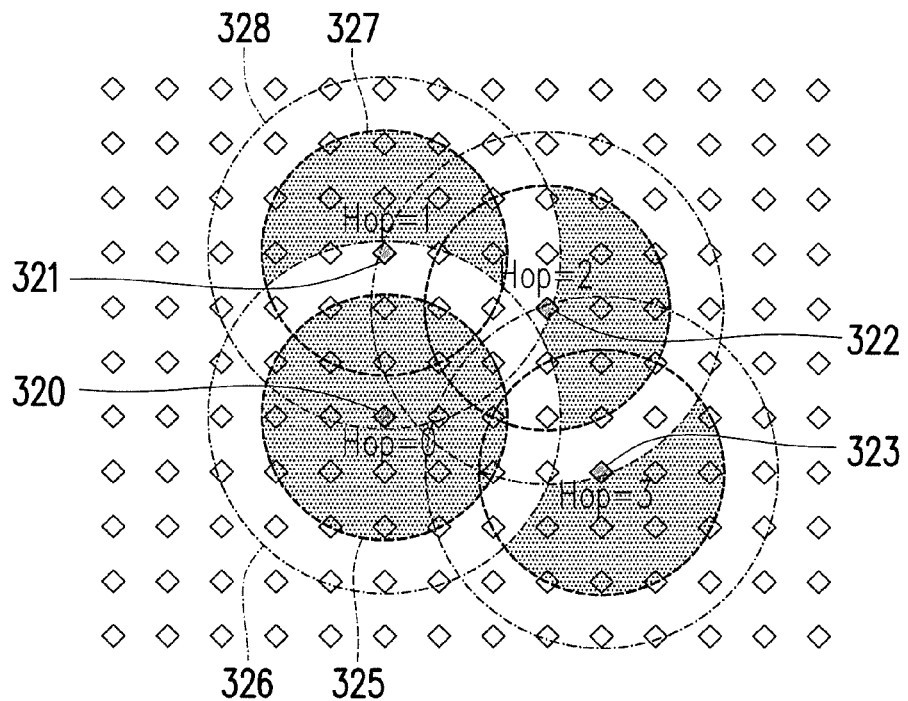
FIG. 3B illustrates a concept of forming an N-hop synchronous network in accordance with the first exemplary embodiment of the disclosure.
Figure 3C:
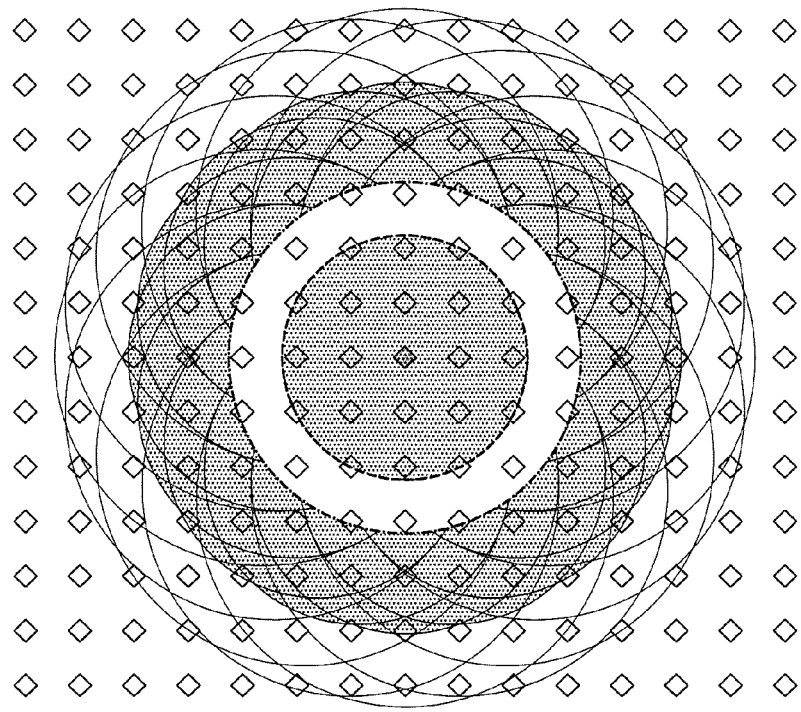
FIG. 3C illustrates the overall coverage of the N-hop synchronous network of FIG. 3A.

The disclosure proposes a first exemplary embodiment as shown in FIG. 3A FIG. 3C and described in the corresponding written description of these figures. FIG. 3A illustrates an example of an N-hop synchronous network of the first exemplary embodiment. For the example of FIG. 3A, it is assumed that the N-hop synchronous network contains not limited to an eNB 311 as well as a plurality of UEs served by the network including not limited to a first UE 301, a second UE 302, and a third UE 303. The first UE 301 is assumed to be within the coverage range 312 of the eNB 311, and the second UE 302 and the third UE 303 are assumed to be outside of the coverage range of the eNB 311. The UEs 301~303 are assumed to possess D2D capabilities.

The eNB 311 may provide frequency synchronization and timing information for normal UEs under the coverage range 312 by transmitting periodically a primary synchronization signal (PSS) and a second synchronization signal (SSS) from which normal UEs would be able to synchronize to the eNB 311. Normal UEs would be UEs that are not SYN sources and may or may not possess D2D capabilities. However, if the power of the eNB 311 received by UEs (e.g., UE 301) that are within the coverage range 312 does not exceed a predefined threshold, such UEs could become a SYN source. The power received by the UEs could be measured in terms of a maximum or an average reference signal received power (RSRP). The predefined threshold could be, for example, anywhere between −80 dBm to −103 dBm, but the disclosure is not limited to only these numbers herein.

Next, the hop count is defined. A hop count of a SYN source is defined as the number of hops from the cluster head to the SYN source. Since the eNB 311 would be both the cluster head and the SYN source, the hop count of the eNB 311 is zero. Assuming that the UE 301 serves as a SYN source as the maximum RSRP of the eNB 311 does not exceed predefined threshold, the number of hops from the eNB to the UE 301 is 1 and thus UE 301 has a hop count of 1. Based on the same rationale, the UE 302 would have a hop count of 2, and UE 303 would have a hop count of 3.

As for UEs (e.g., UEs 302 & 303) that are out of the coverage range 312, whether these UEs are to be served as SYN sources would be determined. In general, for a UE that is outside of the coverage range 312, if the received power from a neighboring SYN source does not exceed a predefined threshold, then the UE becomes SYN source. One condition is that the above mentioned neighboring SYN source has the smallest hop count detected by the UE. If the UE detects that there are multiple nearby SYN sources with the smallest hop count, then the aforementioned neighboring SYN source would be the SYN source that has the highest received power detected by the UE. The highest received power could be the maximum or average RSRP. For the example of FIG. 3A, the UE 302 would be able to obtain timing reference from the in coverage UE 301, and UE 303 would be able to obtain timing reference from an out of coverage UE 302. In this way, the coverage range of the network for D2D communication would not only be expanded but devices that are outside of the coverage range 312 would be synchronized to the network.

FIG. 3B elucidates the disclosure of first exemplary embodiment with another example that is consistent with FIG. 3A. The example of FIG. 3B shows a network that includes a cluster head 320 having a hop count of 0 and a plurality of UEs (represented by diamonds). The cluster head 320 could be an eNB or a UE and is assumed to have a first coverage range 325 and a second coverage range 326. In general, a UE becomes SYN source if the maximum RSRP from neighboring SYN sources with hop count=i does not exceed a predefined threshold, and i is the smallest hop count detected by the UE. The first range 325 is defined as that the signal strength outside of the first range 325 would be less than the predefined threshold, and the signal strength outside of the second range 326 would be so weak that the UEs outside the second range 326 would not be able to receive from the cluster head 320.

The first UE 321 is within the second range 326 and thus is considered within the coverage of the cluster head 320, and the UE 321, being outside of the first range 325, also satisfies the criteria that the maximum RSRP from a neighboring SYN source with the smallest hop count (i.e., hop count of the cluster head 320 is zero) is less than the predefined threshold; therefore, the UE 321 would serve as a SYN source with a hop counter of 1. The second UE 322 is outside the second range 326 of the cluster head 320 and would not be able to discern messages from the cluster head 320. But the second UE 322 is within the coverage range or the second range 328 of the first UE 321 and is outside of the first range 327 of the first UE 321 which is the SYN source with the smallest hop count for the second UE 322. Therefore, the second UE 322 would synchronize to the first UE 321 with the hop counter of 2. By applying similar rationale, the third UE 323 would serve as a third SYN source having a hop count of 3.

Alternatively, if a UE detects a maximum RSRP from a neighboring SYN source with the smallest hop count (i.e., hop count of the cluster head 320 is zero) being larger than the predefined threshold, the UE may become a normal UE instead of a SYN source. Also, if the UE cannot discern any messages from any SYN source, the UE may act as an independent cluster head and provides its own frequency synchronization information for D2D communication with nearby UEs.

Figure 2A:
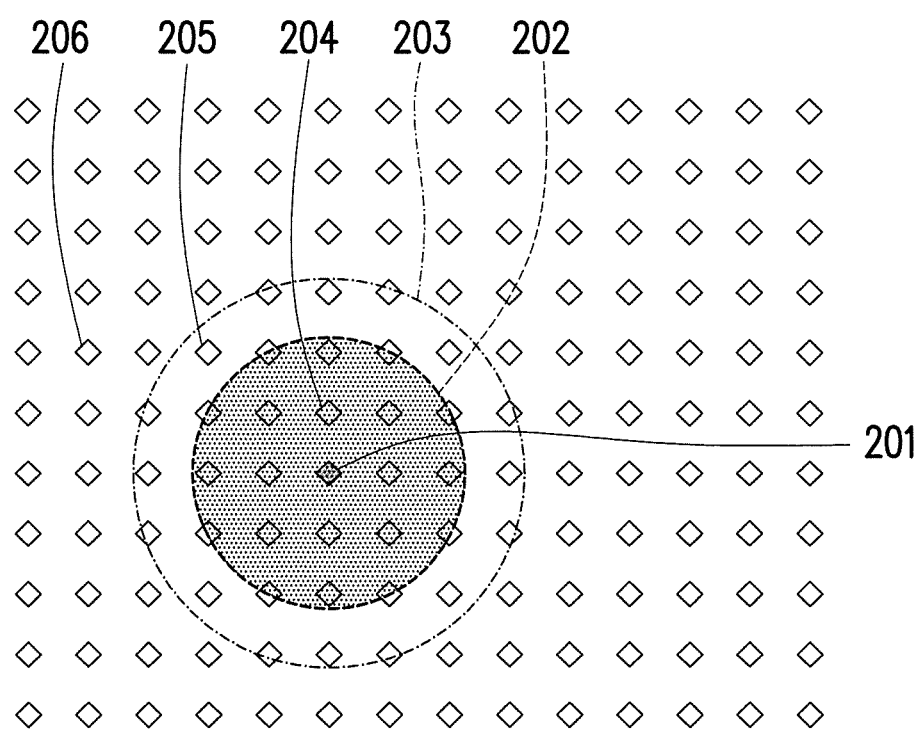
FIG. 2A illustrates a first hypothetical N-hop synchronous network operating under a LTE/LTE-A communication system.
Figure 2B:
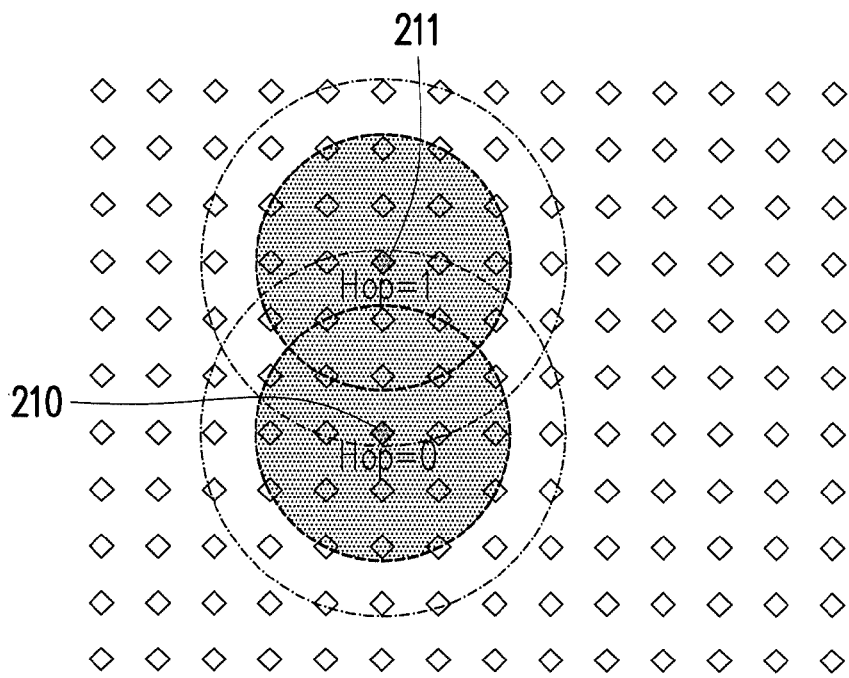
FIG. 2B illustrates a second hypothetical N-hop synchronous network operating under a LTE/LTE-A communication system.
Figure 2C:
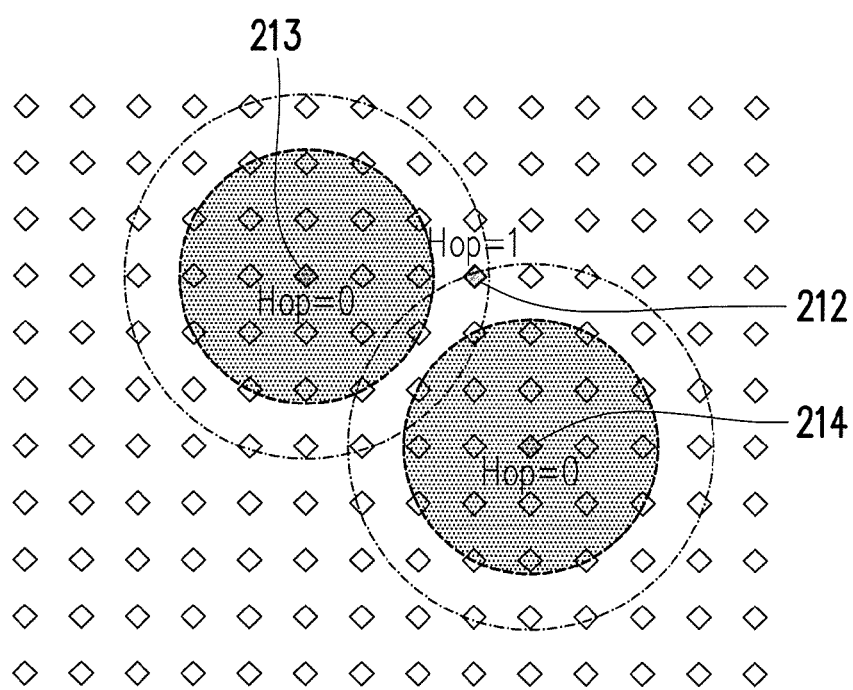
FIG. 2C illustrates a third hypothetical N-hop synchronous network operating under a LTE/LTE-A communication system.
Figure 2D:
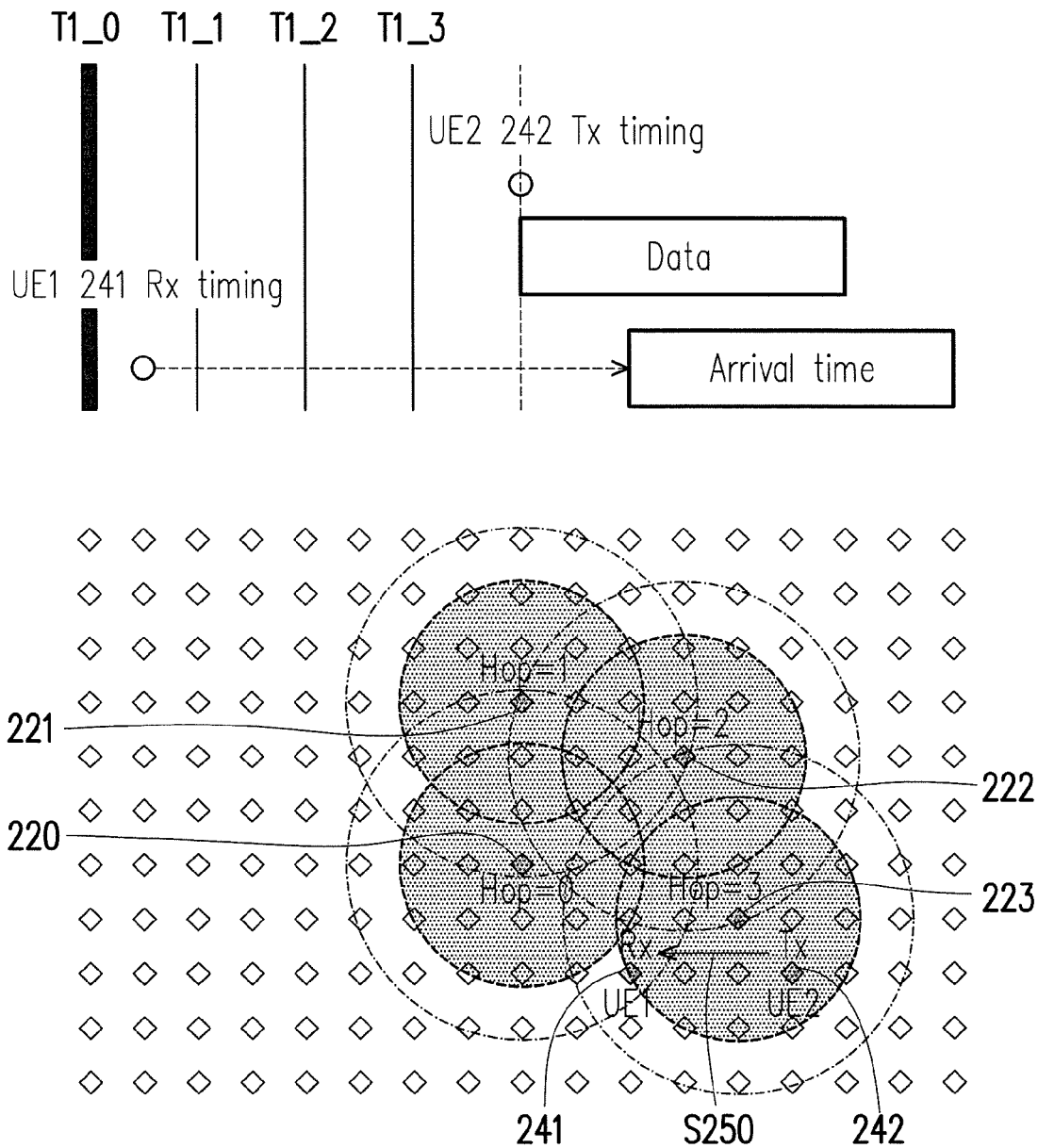
FIG. 2D illustrates a fourth hypothetical N-hop synchronous network operating under a LTE/LTE-A communication system.

It is worth noting that UEs located in the shaded area of FIG. 3B may not become SYN sources for the first exemplary embodiment. In an extreme case such as the one of FIG. 3B which is similar to the scenario of FIG. 2D, there will be marked improvements since the structure of the N-hop Synchronous Network would be reformed to the one similar to FIG. 3C as the quantity of UEs is high.

Figure 4:
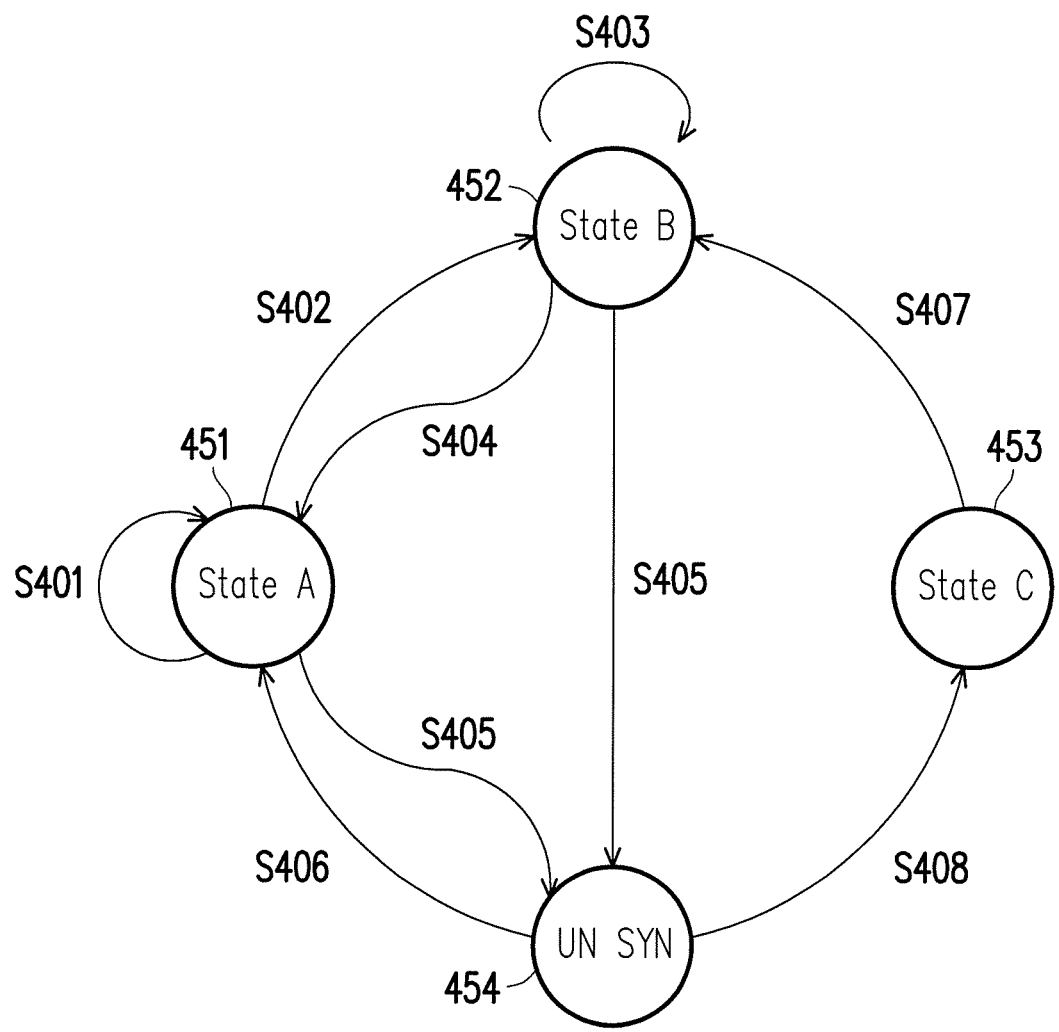
FIG. 4 illustrates a state transition diagram in accordance with one of the exemplary embodiments of the disclosure.

Next, the disclosure provides the details of the operation of a UE according to a state diagram as illustrated in FIG. 4. A UE could have at least four states. In State A 451, the UE would be a normal UE and not as a SYN source. In this state, the UE would synchronize to a D2DSS received from a SYN source. The D2DSS may include a primary D2DSS (PD2DSS) and a secondary D2DSS (SD2DSS). The SYN source could be a UE or could be a base station such as an eNB. If the SYN source is an eNB, the D2DSS may include a PSS and a SSS. In State B 452, the UE would serve as a SYN source in response to receiving a timing reference from another external source from a network. In State C 453, the UE would serve as an independent SYN source without the aid of any external timing reference. In the UNSYN State 454, the UE could be in an initiate state that has just been powered up or just came out of a sleep mode. The UE could also be in a temporarily state that is none of the State A 451, State B 452, and State C 453 (i.e., the UE is not a SYN source nor is the UE synchronized to a SYN source).

When a UE operates in State A 451 as a normal UE, the UE would perform a procedure, called SYN source decision procedure A (i.e., S402), to determine whether it could operate in State B 452 as a SYN source. In the SYN source decision procedure A, assuming that the minimal hop count of neighboring SYN sources is less than N, where N is a non-zero integer, the UE could operate in State B 452 under circumstances described as follows. If the maximum received power from neighbor SYN sources with hop count=i does not exceed a predefined threshold, where i is the smallest hop count detected by the UE for a period of time, then the UE would operate in State B 452. This would signify that the SYN source decision procedure is successful. Moreover, assume that a UE 513 is in the scenario of FIG. 5 between a first cluster 501 and a second cluster 502, where the first cluster 501 has higher priority than the second cluster 502 since the first cluster 501 is operated by an eNB 511. In the SYN source decision procedure A, if the UE 513 which operates in State A 451 as a normal UE synchronizes to the eNB 511 and an error rate of a cyclic redundancy code (CRC) check upon packets received in the D2D Resource Pool is larger than a threshold, then the UE 513 may blindly scan for D2DSS from another cluster (i.e., another N-hop synchronous network) for a short time period. If a D2DSS from another cluster with lower priority has been found, such as a D2DSS from the UE 512, then the UE 513 would operate in State B 452 and remain synchronizing to the eNB 511. However, if the UE 513 which operates in State A 451 as a normal UE synchronizes to the UE 512 and a D2DSS from another cluster with higher priority is found, such as the PSS/SSS from the eNB 511, the UE 513 would then synchronize to the PSS/SSS which has the higher priority and operate in State B 452.

In this disclosure, the prioritization of all synchronization signals is described as follows. The following prioritization rule would apply in the same way for all exemplary embodiments. Among all different synchronization signals, a PSS/SSS from an eNB has the highest priority. A D2DSS derived from the PSS/SSS would be deemed to have the second highest priority over a D2DSS derived from any other D2DSS. A D2DSS transmitted by a SYN source with a smaller hop count has higher priority than D2DSS transmitted by a SYN source with larger hop count.

Figure 6:
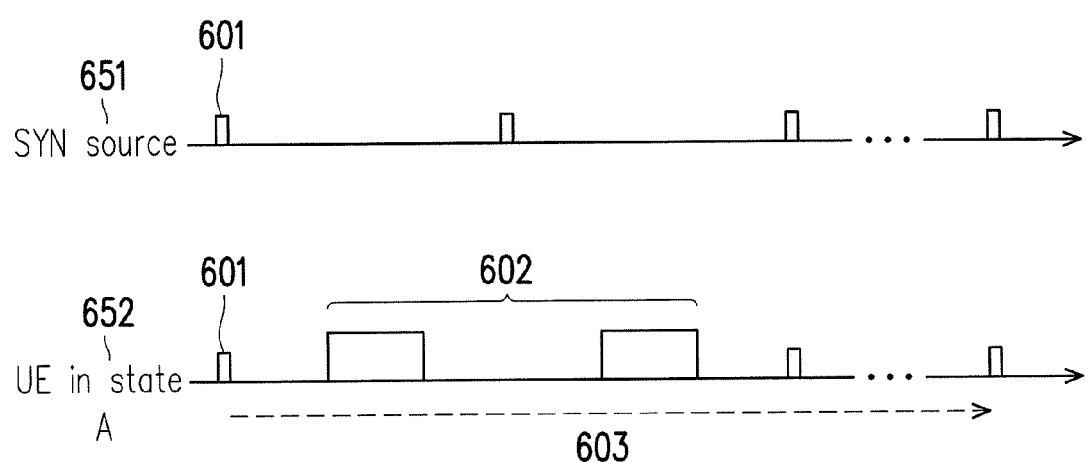
FIG. 6 illustrates a timing diagram of a SYN source operating in State A in accordance with one of the exemplary embodiments of the disclosure.

Except for performing the SYN source decision procedure A, the UE which operates in State A 451 would blindly scan for PSS/SSS from an eNB. If PSS/SSS is found, in step S401, the UE would still operate in State A 451 and synchronize to the PSS/SSS. The UE would also periodically scan D2DSS from neighboring synchronization sources which belong to the same cluster. If a D2DSS which has higher priority is found, in step S401, the UE would still operate in State A 451 and synchronize to the D2DSS. In order to perform the prioritization of synchronization signals and the SYN source decision procedure A, the UE may also receive a hop count information from its neighboring SYN sources. Moreover, the UE would keep monitoring the D2DSS to which it synchronizes with a periodicity. For example, referring to FIG. 6, a UE 652 in State A 451 synchronizes to a D2DSS 601 from a SYN source 651 and monitor for D2D Resource Pool 602 for D2D discovery and communication. The D2DSS 601 could be monitored with a periodicity 603. If the D2DSS 601 is lost or cannot be detected or is missed multiple times, in step S405, the UE 652 would operate in the UNSYN state 454.

In general, the operation of a SYN source in State B 452 is described. A SYN source in State B 452 would perform a procedure, called SYN source decision procedure B (i.e., S404), to determine whether it should operate in State A 451 as a normal UE. In the SYN source decision procedure B, if a maximum received power from neighbor SYN sources with hop count=i exceeds a predefined threshold where i is the smallest hop count detected by the SYN source for a period of time, then in step S404, the SYN source would operate in State A 451 as a normal UE. This would signify that the SYN source decision procedure is failed.

Except for performing the SYN source decision procedure B, the SYN source in State B 452 would periodically and blindly scan for PSS/SSS from an eNB and D2DSS from neighboring synchronization sources which belong to other clusters. Besides, the SYN source would also periodically scan D2DSS from neighboring synchronization sources which belong to the same cluster. If PSS/SSS is found, in step S403, the SYN source would still operate in State B 452 and broadcast a D2DSS based on the PSS/SSS. Otherwise, if a D2DSS which has higher priority is found, in step S403, the SYN source would still operate in State B 452 and broadcast a D2DSS based on the higher priority D2DSS. In order to perform the prioritization of synchronization signals and the SYN source decision procedure B, the SYN source may also receive a hop count information from its neighboring SYN sources. Likewise, the SYN source would configure its hop count to n if the SYN source detects another SYN source with lower hop count (n−1) and then broadcasts the hop count information periodically. Moreover, like the UE which operates in State A 451, the SYN source in State B 452 would also keep monitoring D2D Resource Pool (e.g., 602) and the D2DSS to which it synchronizes with a periodicity. If the D2DSS to which it synchronizes is lost or missed multiple times, then in step S405, the SYN source would operate in the UNSYN State 454.

Operation of a cluster head in State C 453 (e.g., 512 of FIG. 5 and not 513) is described as follows. A cluster head in State C 453 would periodically and blindly scan for PSS/SSS from an eNB and D2DSS from neighboring synchronization sources which belong to other clusters. If PSS/SSS is found, in step S407, the cluster head in State C 453 would operate in State B 452 and broadcast a D2DSS based on the PSS/SSS. Otherwise, if a D2DSS which has higher priority is found, in step S407, the cluster head in State C 453 would operate in State B 452 and broadcast a D2DSS based on the higher priority D2DSS. Like the SYN source which operates in State B 452, the cluster head in State C 453 would configure its hop count to zero and broadcasts the hop count information periodically. Moreover, the cluster head in State C 453 would also monitor D2D Resource Pool (e.g., 602) for D2D discovery and communication.

A UE may operate in the UNSYN State 454 when, in step S405, the UE has just lost the D2DSS from which the UE was synchronizing its timing reference with. When the UE is in the UNSYN state 454, the UE would perform a D2DSS scanning procedure by blindly scanning for a synchronization signal (SS) for a time period. If at least a SS has been found, the UE would synchronize to the SS with the highest priority and in step S406 operate in State A 451. Otherwise if the above mentioned time period has expired without detecting a suitable SS, then the UE would transmits a D2DSS on its own without timing reference and in step S408 operate in State C 453.

Figure 7A:
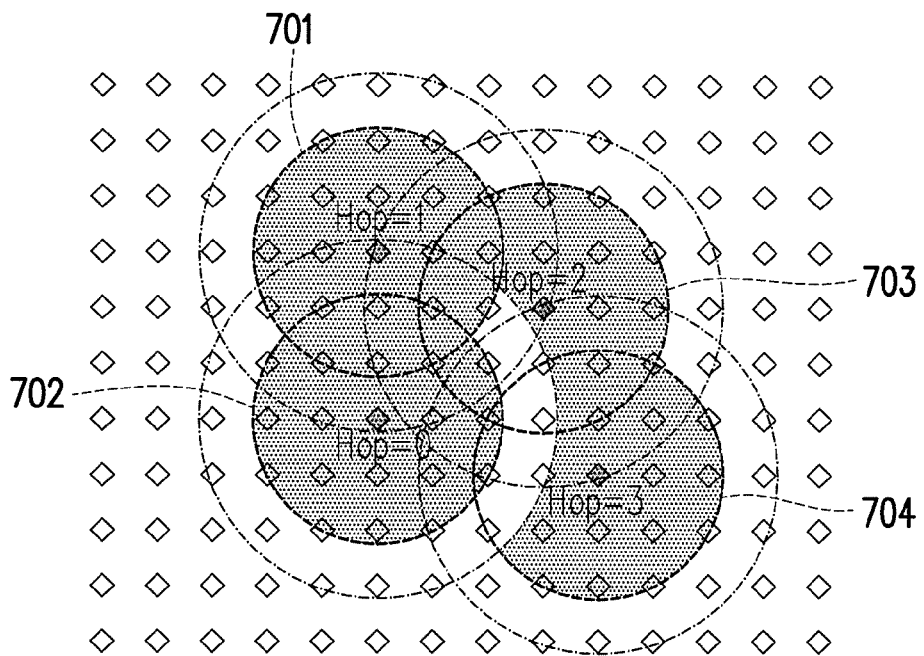
FIG. 7A illustrates a concept of forming an N-hop synchronous network in accordance with the second exemplary embodiment of the disclosure.

FIG. 7A illustrates a concept of forming an N-hop synchronous network in accordance with the second exemplary embodiment of the disclosure. The scenario of FIG. 7A is similar to the scenario of FIG. 3B, and thus repeated description of the scenario is avoided. However, the criteria of forming a SYN source is different. For the second exemplary embodiment, the criteria for a UE to become a SYN source is that the UE would become a SYN source if or only if a maximum RSRP from neighboring SYN sources having hop count=i or i+1 does not exceed a predefined threshold, where i is the smallest hop count detected by the UE. If the maximum RSRP from neighbor SYN sources having hop counter=i and i+1 does exceed the predefined threshold, then the UE does not become a SYN source, operate as a normal UE, and synchronizes with one of the neighboring SYN sources.

Figure 7B:
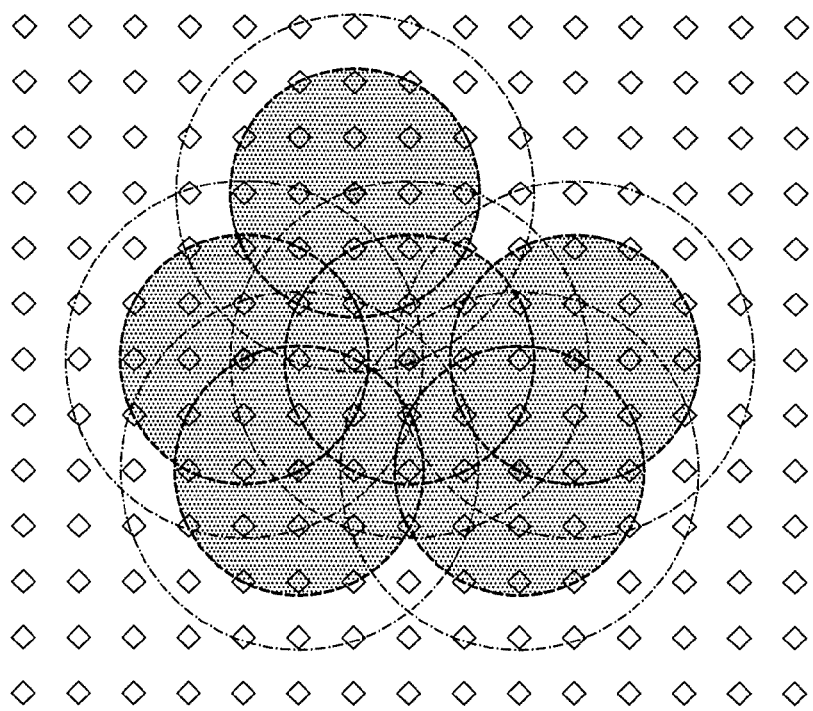
FIG. 7B illustrates the overall coverage of the N-hop synchronous network of FIG. 7A.

In FIG. 7A, by following the aforementioned criteria, it can be derived that if a UE is within the shaded portion of the four first ranges 701, 702, 703, and 704, then the UE would not be a SYN source for the second embodiment according to the criteria as aforementioned. Therefore, even for the extreme case of FIG. 2D, it could be possible to reform the N-hop Synchronous Network. If the quantity of UEs is high, the N-hop Synchronous Network could be formed to be similar to the structure shown in FIG. 7B.

To describe the second embodiment in further detail, the state diagram of FIG. 4 will be made reference to. For the second embodiment, the SYN source decision procedure A would assume that the minimal hop count of neighboring SYN sources is less than N, where N is a non-zero integer. If or only if the maximum received power from neighbor SYN sources which are with hop count=i or i+1 does not exceed a predefined threshold, where i=the smallest hop count of neighboring SYN sources detected by the UE for a period of time, the UE would operate in State B 452.

Figure 5:
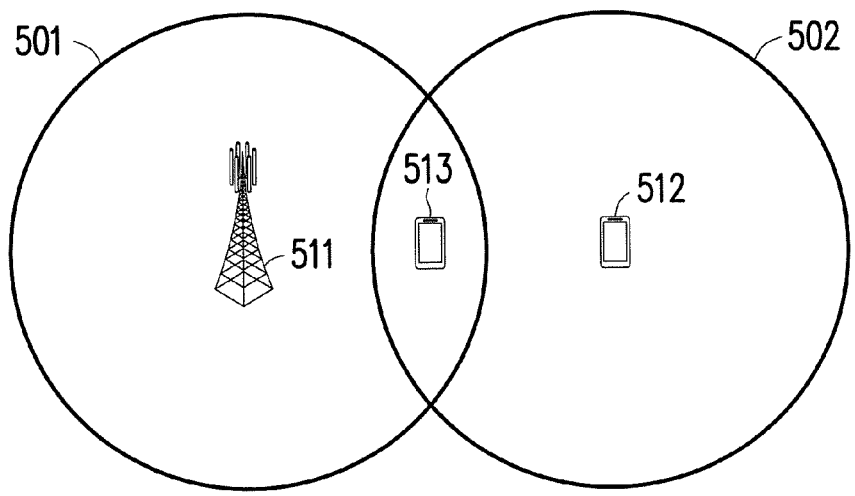
FIG. 5 illustrates a scenario in which a UE determining a SYN source decision procedure in accordance with one of the exemplary embodiments of the disclosure.

When the UE is in a scenario similar to FIG. 5 in which there is a first cluster 501 having a higher priority than a second cluster 502, if an error rate of a CRC check of packets received in the D2D Resource Pool (e.g., 602) is larger than a threshold, the UE would then blindly scans for D2DSS from another cluster for a short time period. If a D2DSS from another cluster has been determined to be a lower priority, the UE would operate in State B 452 as the procedure A has been successful and remain synchronizing to the D2DSS of the current cluster. However, if a D2DSS from the another cluster has been determined to have a higher priority than the D2DSS of the current cluster, the UE would then synchronize to the D2DSS that has a higher priority and hence operate in State B 452 as such procedure is also deemed successful.

For the second exemplary embodiment, the SYN source decision procedure B is that if a maximum RSRP received by a SYN source in State B 452 from neighboring SYN sources having hop count=i and i+1 that exceeds the predefined threshold, where i is the neighboring SYN sources with the smallest hop count as detected by the SYN source for a period of time, then in step S404, the SYN source would operate in State A 451 as a normal UE and the procedure has failed.

As for the operation of a UE in State UNSYN 454, in State A 451, in State B 452, and in State C 453, the operation of the UE in these states would be the same as the first exemplary embodiment and thus a repeated description is avoided.

Figure 8A:
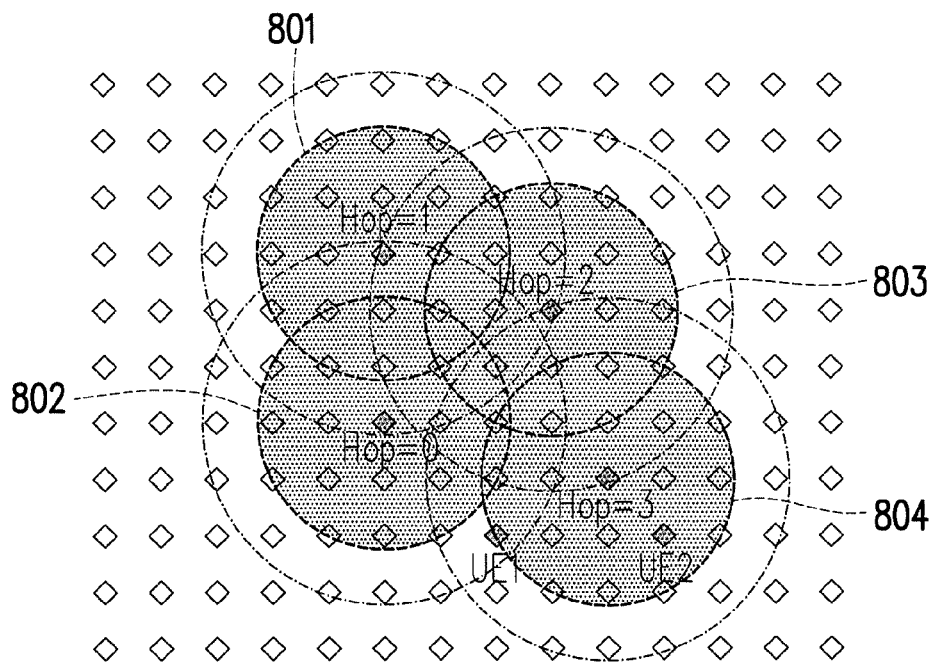
FIG. 8A illustrates a concept of forming an N-hop synchronous network in accordance with the third exemplary embodiment of the disclosure.

FIG. 8A illustrates a concept of forming an N-hop synchronous network in accordance with the third exemplary embodiment of the disclosure. The scenario of FIG. 8A is similar to the scenario of FIG. 3B, and thus repeated description of the scenario is avoided. However, the criteria of forming a SYN source is different. For the third exemplary embodiment, the criteria for a UE to become a SYN source is that a UE would become a SYN source if the UE receives a maximum RSRP from neighboring SYN sources which does not exceed a predefined threshold or if a difference of hop counts between neighboring SYN sources is larger than 2. Otherwise if the UE receives from neighboring SYN sources a maximum RSRP that does exceed the predefined threshold and if the difference of hop counts between neighboring SYN sources is not larger than two, then the UE may become a normal UE rather than serving as a SYN source. In this case, the UE may synchronize with one of the neighboring SYN sources.

Figure 8B:
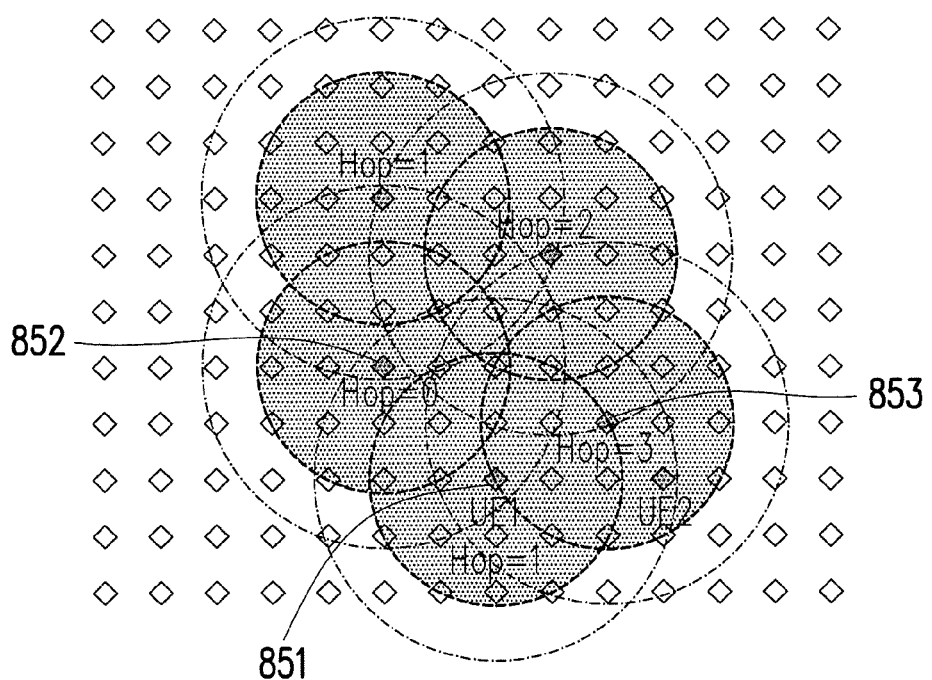
FIG. 8B illustrates the overall coverage of the N-hop synchronous network of FIG. 9A.

Based on the aforementioned criteria, it would evident that if a UE is located within the shaded areas 801, 802, 803, and 804 of FIG. 8A, then the UE would not be a SYN source except that the difference of hop counts between neighboring SYN sources is not larger than two. Even if the extreme case of FIG. 2D occurs, it would be possible to reform the N-hop synchronous network. The reformed network is shown in FIG. 8B. Since a first UE 851 would receive a D2DSS from a SYN source 852 with hop count=0 and a D2DSS from a SYN source 853 with a hop count of 3, the UE 851 could then become a SYN source with a hop count of 1 as according to the aforementioned criteria. Also when the first UE 851 becomes a SYN source with a hop count of 1, the SYN source 853 with a hop count of 3 can update the hop count to 2 and thus reformed structure of FIG. 8B could be derived from such principle.

The third exemplary embodiment is to be described in further details as the SYN source decision procedure A is described as follows with reference to the state diagram of FIG. 4, assuming that the minimal hop count of neighboring SYN sources is less than N, where N is a non-zero integer. If a maximum RSRP received by a UE from neighbor SYN sources does not exceed a predefined threshold for a period of time, then the UE would operate in State B 452 as the SYN source decision would deemed to be successful. Also if a difference of hop counts of neighbor SYN sources is larger than 2 for a period of time, then the UE would operate in State B 452 as the SYN source decision is also successful.

When the UE is in a scenario similar to FIG. 5 in which there is a first cluster 501 having a higher priority than a second cluster 502, if an error rate of a CRC check of packets received in the D2D Resource Pool (e.g., 602) is larger than a threshold, the UE would then blindly scans for D2DSS from another cluster for a short time period. If a D2DSS from another cluster has been determined to be a lower priority, the UE would operate in State B 452 as the procedure A has been successful and remain synchronizing to the D2DSS of the current cluster. However, if a D2DSS from the another cluster has been determined to have a higher priority than the D2DSS of the current cluster, the UE would then synchronize to the D2DSS that has a higher priority and hence operate in State B 452 as such procedure is also deemed successful.

For the third exemplary embodiment, the SYN source decision procedure B is described as follows. If a SYN source in State B 452 receives a maximum RSRP from neighbor SYN sources exceeds a predefined threshold for a period of time, and if the SYN source is not a superordinate node of any neighboring SYN source based on superordinate node information of neighboring SYN sources, where the superordinate node is a neighboring SYN source which has the minimum value of hop count, then the SYN source would operate in State A 451 as a normal UE instead of a SYN source.

For the third exemplary embodiment, the operation of a UE in the UNSYN State 454 and in State A 451 would be the same as the first exemplary embodiment and thus a repetition of descriptions is avoided.

As for the operation of State B 452, the SYN source would periodically and blindly scan for PSS/SSS from an eNB and D2DSS from neighboring synchronization sources which belong to other clusters. Besides, the SYN source would also periodically scan D2DSS from neighboring synchronization sources which belong to the same cluster. If the SYN source detects a higher priority D2DSS, then the SYN source would in step S403 synchronize to the D2DSS, update its hop count and the superordinate node, and remain operating in State B 452. The SYN source would monitor D2D Resource Pool (e.g., 602) for D2D discovery and communication and would also monitor D2DSS with a periodicity. The SYN source would update the hop count and superordinate node while the original superordinate node disappears. If the D2DSS has been lost or is missed for consecutive times, then in step S405 the SYN source would operate in the UNSYN state 454.

Also while in State B 452, the SYN source may receive information related to hop counts and superordinate node of its neighboring SYN sources. The SYN source may broadcast its hop count and superordinate node information with a periodicity, and the SYN source would also broadcast its own D2DSS based on timing reference from the previously received D2DSS. The SYN resource could subsequently perform the SYN source decision of procedure B.

For the third exemplary embodiment, the operation of a cluster head (e.g., 512) in State C 453 is described as follows. While operating as an independent SYN source, the cluster head (e.g., 512) would periodically and blindly scan for PSS/SSS from a eNB and D2DSS from neighboring synchronization sources which belong to other clusters. If a higher priority D2DSS has been detected, the cluster head (e.g., 512) would synchronize to the D2DSS, update its hop count and superordinate node, and in step S407 operate in State B 452. The cluster head (e.g., 512) in State C 453 would also monitor D2D Resource Pool (e.g., 602) for D2D discovery and communication, broadcast its hop count information with a periodicity, and broadcast its own D2DSS with a periodicity without timing reference from another SYN source unless a higher priority D2DSS has been detected.

A concept of forming an N-hop synchronous network in accordance with the fourth exemplary embodiment of the disclosure is disclosed herein. In general, the criteria for determining whether a UE becomes a SYN source is that a UE would become a SYN source if the UE would be able to extend coverage based on location information of neighboring SYN sources or if a difference of hop counts of neighbor SYN sources is larger than 2. The location information of a UE is assumed to be available by the aid of positioning devices such as a global positioning satellite (GPS) system. A UE can extend coverage could be meant by the definition that a UE may be able to extend coverage if the coverage area of neighboring SYN sources cannot fully cover the coverage area of the UE. If the UE would not be able to extend coverage based on location information of neighboring SYN sources and if a difference of hop counts of neighbor SYN sources is not larger than 2, then the UE would operate as a normal UE rather than a SYN source.

Figure 9:
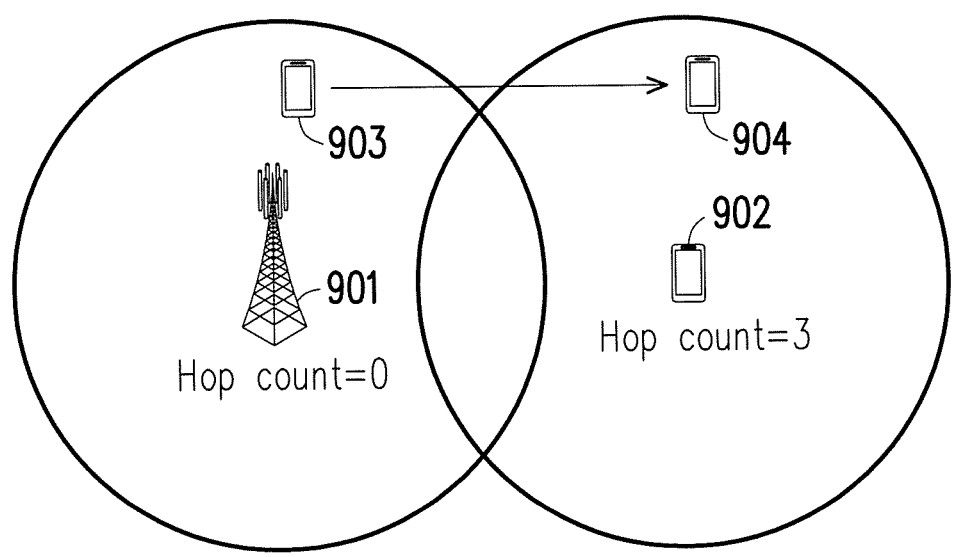
FIG. 9 illustrates a concept of forming an N-hop synchronous network in accordance with the fourth exemplary embodiment of the disclosure.

In an N-hop Synchronous Network formed by the fourth exemplary embodiment, the length of a CP could be 2TA. Referring to FIG. 9, when operating under the fourth exemplary embodiment, the scenario of FIG. 9 would not occur even if there is no UE located at the intersection of the coverage of the first SYN Source 901 and the second SYN Source 902. The first UE 903 is assumed to synchronize to the first SYN Source 901, and the second UE 904 is assumed to synchronize to the second SYN Source 904. The difference of the hop count between the first SYN Source 901 and the second SYN source 902 would be larger than 2. This could be proved as follows.

Under a first premise, assuming that the aforementioned circumstance occurs, the SYN sources surrounding the second UE 904 would necessarily have hop counts greater or equal to 3. Under a second premise, since the first UE 903 does not become a SYN source, this signifies that its neighboring SYN sources already covered the range that could be covered by the first UE 903 include the location of the second UE 904. Under a third hypothesis, since the first UE 903 does not become a SYN source, this signifies that its neighboring SYN sources all have hop counts that are equal or less than 2. A fourth premise can be deduced based on the first and third premise that all SYN sources that have ranges covering the second UE 904 would all have hop counts that are equal or less than 2. A fifth premise can be deduced based on the fact that the first premise contradicts with the fourth premise. Therefore, it can be concluded that the scenario of FIG. 9 would not occur as difference of the hop count between the first SYN Source 901 and the second SYN source 902 would be larger than 2.

Figure 10A:
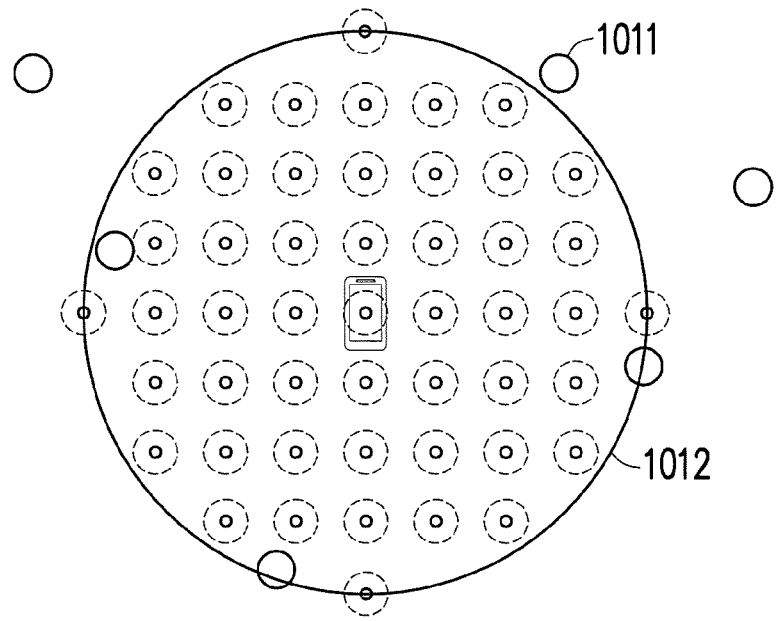
FIG. 10A illustrates determining whether a UE can extend coverage by sampling in accordance with one of the exemplary embodiments of the disclosure.
Figure 10B:
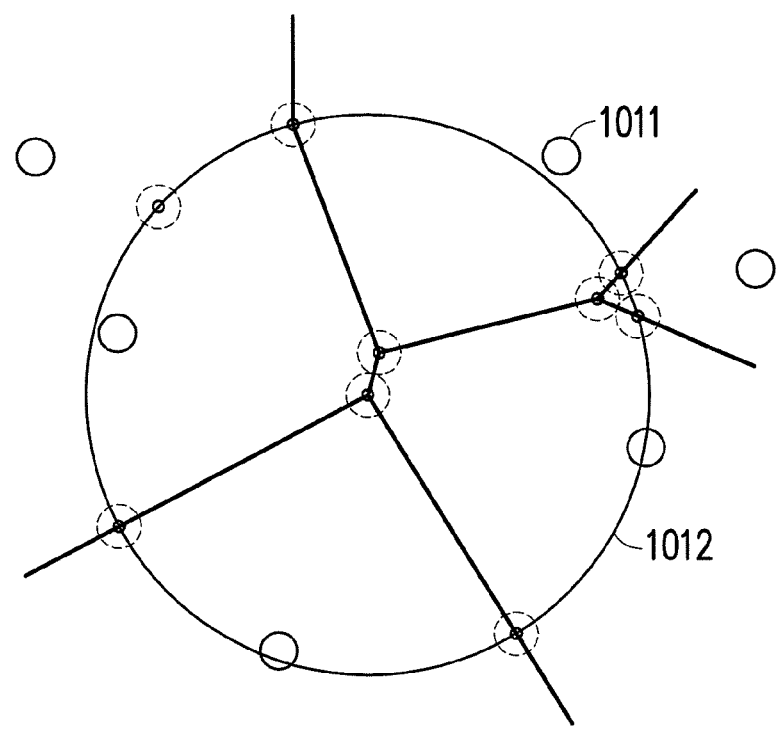
FIG. 10B illustrates determining whether a UE can extend coverage by using a Voronoi diagram.
Figure 10C:
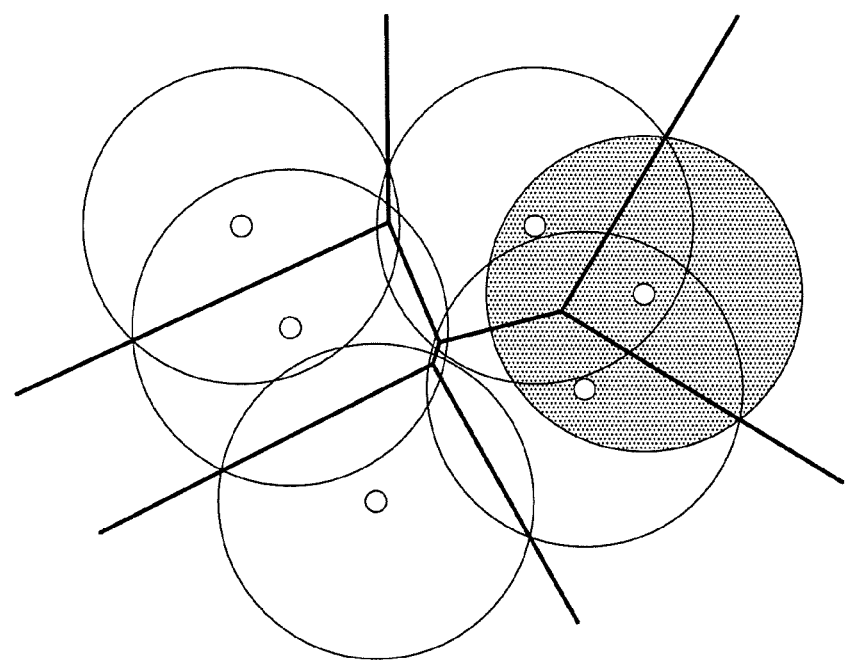
FIG. 10C & FIG. 10D illustrates Voronoi diagrams using FIG. 10B.
Figure 10D:
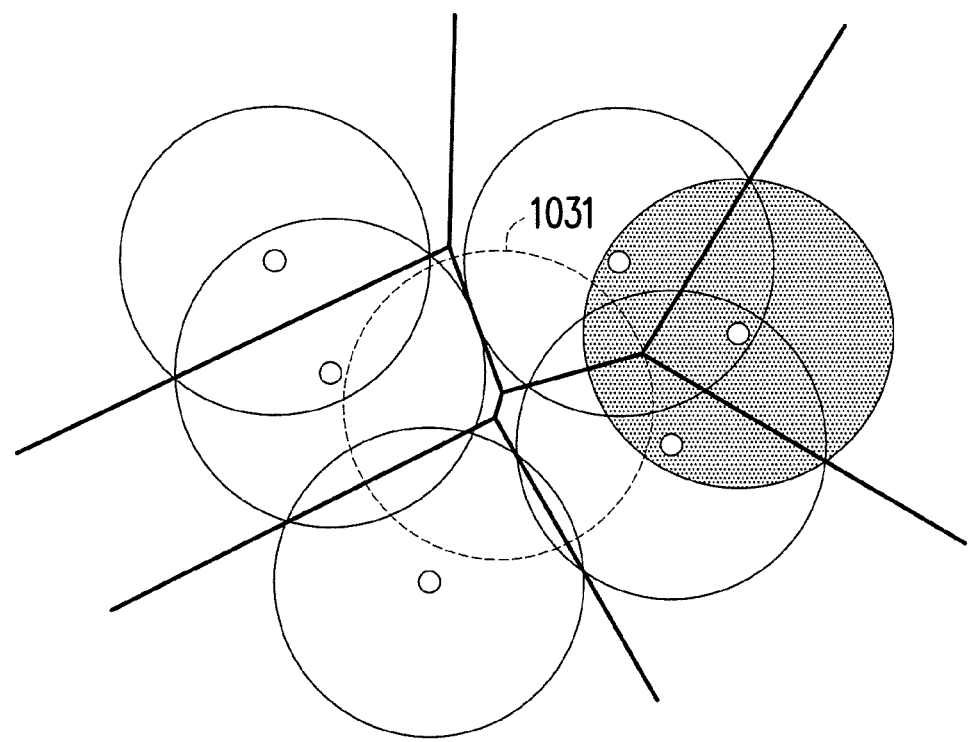

As for determining whether a SYN source can extend coverage based on location information, a first method based on sampling as illustrated in FIG. 10A and alternatively a second method based on using a Voronoi diagram as illustrated in FIG. 10B~10D. Referring to FIG. 10B, if the number of neighboring SYN sources 1011 is greater than 1, then a Voronoi diagram is to be drawn based on the neighboring SYN sources 1011. First, a predefined coverage circle 1012 is drawn. Next, whether the coverage area of neighboring SYN sources 1011 cover the Voronoi vertexes which is inside the circle and also whether the coverage area of neighboring SYN sources 1011 cover the intersection points between the Voronoi diagram and the circle should be checked. If so, then a UE cannot extend coverage. Otherwise, the UE can extend coverage. The UE can also extend coverage if the number of the number of neighboring SYN sources 1011 is not greater than 1. FIG. 10C & FIG. 10D illustrates Voronoi diagrams using FIG. 10B. It should be noted that for FIG. 10D, the new coverage area must cover Voronoi vertexes or cover the intersection between the Voronoi diagram and the predefined circle 1012.

The fourth exemplary embodiment is to be described with further details as the SYN source decision procedure A is described herein assuming that the minimal hop count of neighboring SYN sources is less than N, wherein N is a non-zero integer. In general, if a UE can coverage, that is, the coverage area of neighboring SYN sources cannot fully cover the coverage area of the UE based on location information of neighboring SYN sources, then the UE would operate in State B 452 as the SYN source decision procedure has been successful. Also, if a difference of hop counts between neighboring SYN sources is larger than 2 for a period of time, then the UE would operate in State B 452 as the procedure has been successful.

When the UE is in a scenario similar to FIG. 5 in which there is a first cluster 501 having a higher priority than a second cluster 502, if an error rate of a CRC check of packets received in the D2D Resource Pool (e.g., 602) is larger than a threshold, the UE would then blindly scans for D2DSS from another cluster for a short time period. If a D2DSS from another cluster has been determined to be a lower priority, the UE would operate in State B 452 as the procedure A has been successful and remain synchronizing to the D2DSS of the current cluster. However, if a D2DSS from the another cluster has been determined to have a higher priority than the D2DSS of the current cluster, the UE would then synchronize to the D2DSS that has a higher priority and hence operate in State B 452 as such procedure is also deemed successful.

Moreover, the SYN source decision procedure B of the fourth exemplary embodiment is described as follows. If a SYN source in State B 452 cannot extend coverage such that the coverage area of neighboring SYN sources can fully cover the coverage area of the SYN source based on location information of neighboring SYN sources, and if the SYN source is not the superordinate node of any neighboring SYN source based on superordinate node information of neighboring SYN sources, then the SYN source would operate in State A 451 as the procedure has failed. The superordinate node is a neighboring SYN source which has the minimum value of hop count.

For the fourth exemplary embodiment, the operation of a UE in the UNSYN State 454 would be the same as the first exemplary embodiment.

As for the operation of a UE in State A 451 as a normal UE rather than a SYN source, the UE in state A 451 would blindly scan for PSS/SSS from an eNB periodically. If PSS/SSS has been found, the UE would then in step S401 synchronize to the PSS/SSS and remain in the same State A 451. The UE would also periodically scan D2DSS from neighboring synchronization sources which belong to the same cluster. If a D2DSS which has higher priority is found, in step S401, the UE would still operate in State A 451 and synchronize to the D2DSS. The UE would also monitor the D2D Resource Pool (e.g., 602) for D2D discovery and communication. If the UE has lost the D2DSS or misses it multiple times, then the UE would execute step S405 and operate in the UNSYN state 454. The UE operating in State A 451 would also receive location information and hop count information of the neighboring SYN sources of the UE. Subsequently, the UE may perform SYN source decision procedure A of the fourth exemplary embodiment as aforementioned.

The operation of a SYN source in State B 452 would be described as follows. A SYN source in State B 452 would periodically and blindly scan for PSS/SSS from an eNB and D2DSS from neighboring synchronization sources which belong to other clusters. Besides, the SYN source would also periodically scan D2DSS from neighboring synchronization sources which belong to the same cluster. If a higher priority D2DSS is found, then the SYN source would execute step S403 by synchronizing to the D2DSS, updating the hop count and superordinate node, and remaining in State B 452. The SYN source in State B 452 would monitor for D2D Resource Pool (e.g., 602) for D2D discovery and communication and also monitor for D2DSS with a periodicity. The SYN source would update hop count & superordinate node while the original superordinate node disappears. If the D2DSS has been lost or missed multiple times, then the SYN source would execute step S405 and operate in the State UNSYN 454. The SYN source in State B 452 may also receive hop count, location and superordinate node information of its neighboring SYN sources, broadcast its hop count, and location and superordinate node information with a periodicity. The SYN source would broadcast a D2DSS which has a timing reference based on the D2DSS that has been received with a periodicity. Subsequently, the SYN source may perform SYN source decision procedure B as aforementioned.

The operation of a cluster head in State C 453 is described as follows. While operating as an independent SYN source, a cluster head in State C 453 would periodically and blindly scan for PSS/SSS from an eNB and D2DSS from neighboring synchronization sources which belong to other clusters. If a higher priority D2DSS has found, the cluster head would execute step S407 by synchronizing to the highest priority D2DSS, updating the hop count & superordinate node, and operating in State B 452. The cluster head in State C 453 would also monitor D2D Resource Pool (e.g., 602) for D2D discovery and communication. The cluster head in State C 453 would broadcast its hop count information and location information with a periodicity. The cluster head in State C 453 would also broadcast a D2DSS with a periodicity without the aid of any external timing reference.

Figure 11:
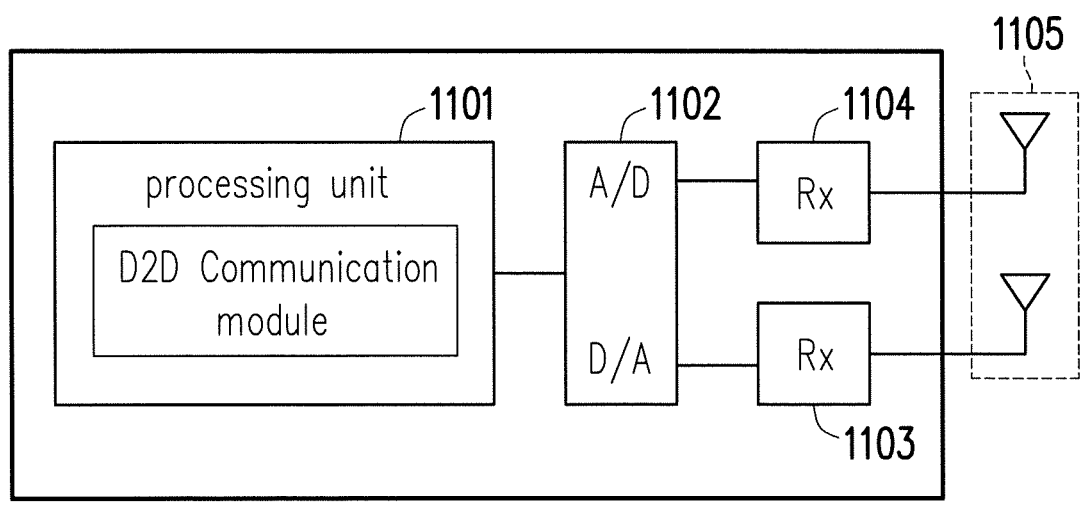
FIG. 11 illustrates an exemplary user equipment with D2D capability in accordance with one of the exemplary embodiment of the disclosure.

FIG. 11 illustrates the hardware components of a UE in terms of functional block diagrams in accordance with one of the exemplary embodiments of the disclosure.

The exemplary UE would include not limited to a processing circuit 1101, an analog to digital (A/D)/digital to analog (D/A) converting circuit 1102, a transmitter 1103, a receiver 1104, one or more antennas 1105, and a non-transitory storage medium or memory unit (not shown) coupled to the processing circuit 1101. The UE would receive radio frequency (RF) signals through the one or more antennas 1105 which would be coupled to the receiver 1104 via a matching network and a filter. The receiver 1104 would be coupled to the A/D D/A converter 1102 and would down convert the RF signals directly or indirectly into baseband data. The baseband data is converted by the A/D converter 1102 into digital data which would be transmitted to the processing circuit 1101. The UE would also transmit data by transmitting digital data to the D/A converter 1102 to be converted into baseband data. The baseband data would be up converted into RF data by the transmitter 1103 which transmits RF data via the one or more antennas 1105.

The processing circuit 1101 would include one or more processing means such as a microprocessor, microcontroller, and application specific integrated circuit (ASIC). Contained within the processing circuit 1101 is a D2D communication module 506 which would execute functions related to D2D communications including being directly involved or indirectly assist in the execution of the proposed method including the first, second, third, and fourth exemplary embodiments. The storage medium may store programming codes, buffered and permanent data related to the operations of the proposed connection modification method.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

Figure 12:
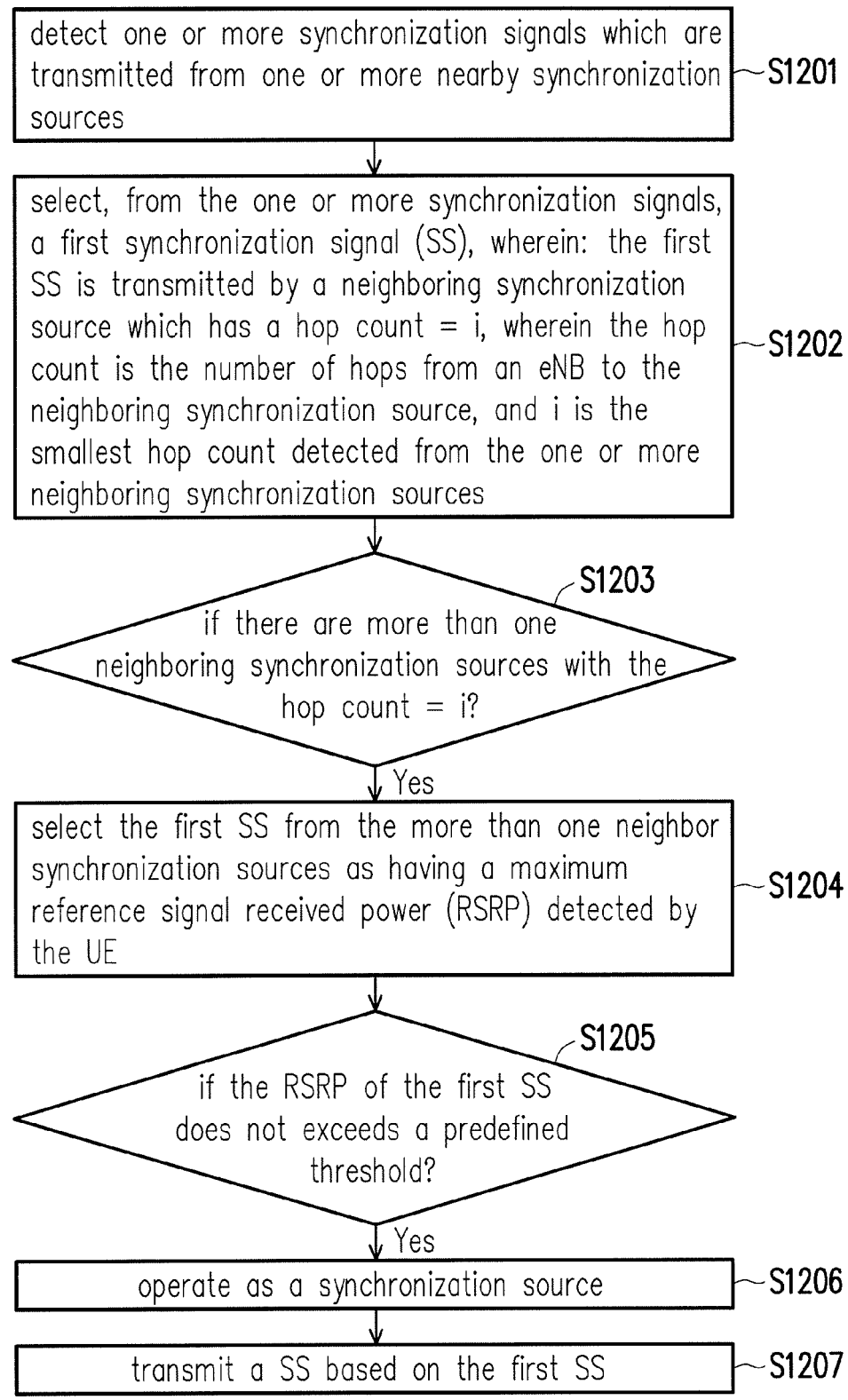
FIG. 12 is a flow chart which relates to the first exemplary embodiment of the disclosure.

FIG. 12 is a flow chart which relates to the first exemplary embodiment of the disclosure. In general, the first exemplary embodiment from the perspective of a UE could be summarized as follows. In step S1201, the UE would detect one or more synchronization signals which are transmitted from one or more nearby synchronization sources. In step S1202, the UE would select, from the one or more synchronization signals, a first synchronization signal (SS), wherein: the first SS is transmitted by a neighboring synchronization source which has a hop count=i, wherein the hop count is the number of hops from an eNB to the neighboring synchronization source, and i is the smallest hop count detected from the one or more neighboring synchronization sources. In step S1203, the UE would determine if there are more than one neighboring synchronization sources with the hop count=i. If so, in step S1204 the UE would select the first SS from the more than one neighbor synchronization sources as having a maximum reference signal received power (RSRP) detected by the UE. In step S1205, the UE would determine if the RSRP of the first SS does not exceed a predefined threshold. If so, in step S1206, the UE would operate as a synchronization source, and in step S1207, the UE would transmit a SS based on the first SS.

Optionally, if the RSRP of the first SS exceeds a predefined threshold, then the UE would not operate as the synchronization source but would synchronize to the first SS.

The UE may optionally perform a cyclic redundancy code (CRC) check for data packets received from one or more nearby UEs. The UE may scan for a second SS transmitted from a neighboring synchronization source which belongs to another N-hop synchronous network in response to an error rate of the CRC check exceeding an error rate threshold. If the second SS is determined to have a higher priority than the first SS, then the UE would operate as the synchronization source and transmit a SS based on the second SS. If the second SS is detected to have a lower priority than the first SS, then the UE would operate as the synchronization source and transmit a SS based on the first SS.

In response to the UE the operating as the synchronization source, the UE may optionally also scan for the second SS from a neighboring synchronization source which belongs to another N-hop synchronous network periodically and transmit a SS based on the second SS if the second SS has a higher priority than the first SS.

Optionally, operating as the synchronization source may also further include scanning for a primary SS (PSS) and a secondary SS (SSS) periodically, scanning for a third SS from a neighboring synchronization source which belongs to the same N-hop synchronous network periodically, transmitting a SS based on the PSS and the SSS if the PSS and the SSS are detected; and otherwise transmitting a SS based on the third SS if the third SS is detected and has higher priority than the first SS.

Furthermore, operating as the synchronization source may optionally include configuring the hop count of the UE to n if the UE transmits a SS based on another SS which is transmitted by a neighboring synchronization source having a lower hop count of n−1 and broadcasting the hop count periodically.

In response to not operating as the synchronization source, the UE may optionally scan for the PSS and the SSS periodically, scan for the third SS from a neighboring synchronization source which belongs to the same N-hop synchronous network periodically, synchronize to the PSS and the SSS if the PSS and the SSS are detected, but otherwise synchronize to the third SS if the third SS is detected and has higher priority than the first SS.

In response to losing the first SS, the UE may also optionally scan for the one or more synchronization signals for a fixed period. If the UE fails to detect the one or more synchronization signals during the fixed period, the UE may operate as a cluster head and transmit a SS without timing reference.

If the UE operates as the cluster head, the UE may optionally scans for the second SS from a neighboring synchronization source which belongs to another N-hop synchronous network periodically. If the second SS has a higher priority than the UE, then the UE may optionally operate as the synchronization source and transmit a SS based on the second SS.

Optionally, the UE may also scan for the PSS and the SSS periodically. If the PSS and the SSS are detected, the UE may operate as the synchronization source and transmit a SS based on the PSS and the SSS. Moreover, the UE may further configure the hop count of the UE to zero and broadcasts the hop count periodically.

Figure 13:
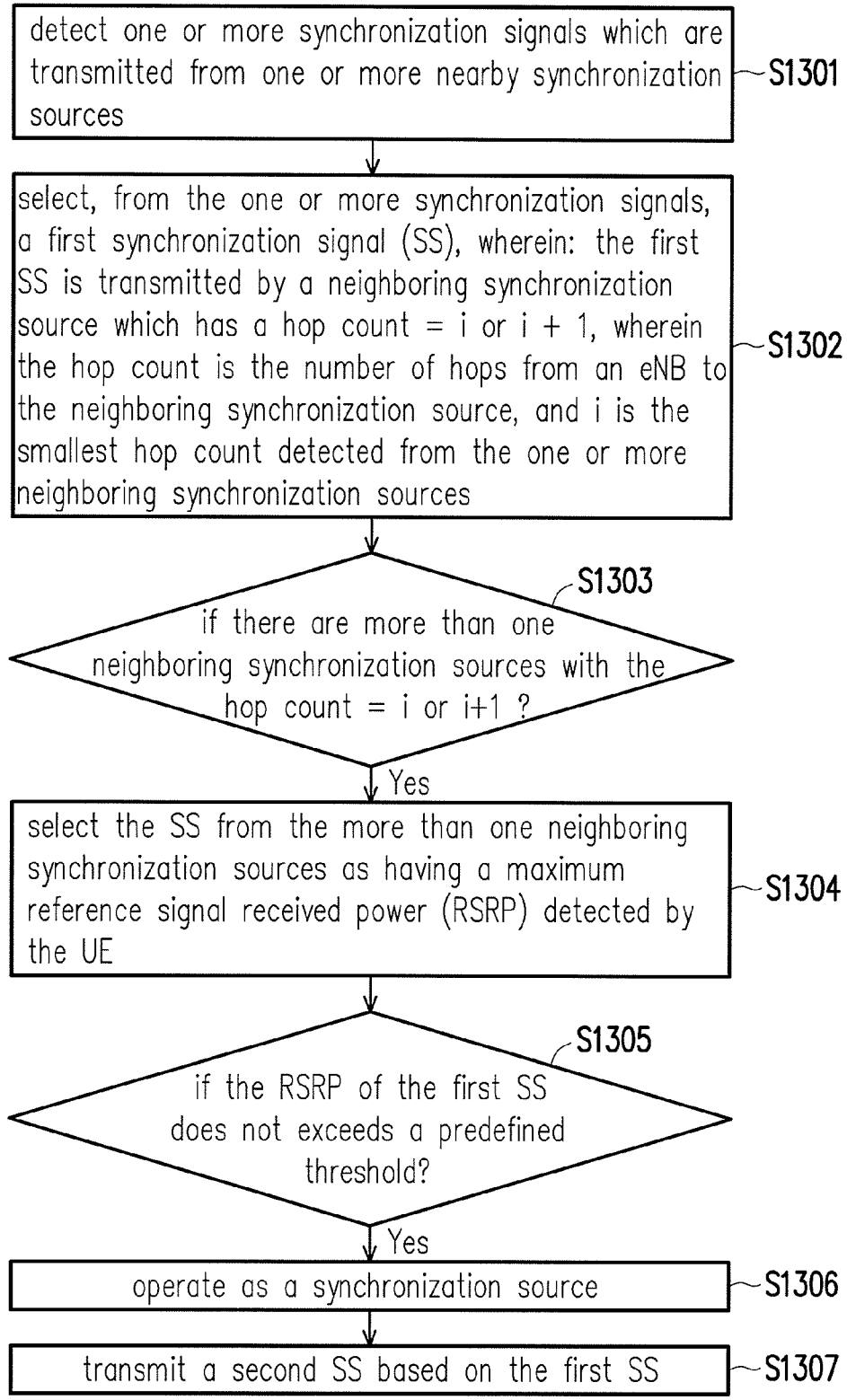
FIG. 13 is a flow chart which relates to the second exemplary embodiment of the disclosure.

FIG. 13 is a flow chart which relates to the second exemplary embodiment of the disclosure. In step S1301, the UE would detect one or more synchronization signals which are transmitted from one or more nearby synchronization sources. In step S1302, the UE would select, from the one or more synchronization signals, a first synchronization signal (SS), wherein: the first SS is transmitted by a neighboring synchronization source which has a hop count=i or i+1, wherein the hop count is the number of hops from an eNB to the neighboring synchronization source, and i is the smallest hop count detected from the one or more neighboring synchronization sources. In step S1303, the UE would determine if there are more than one neighboring synchronization sources with the hop count=i or i+1. If so, in step S1304, the UE would select the SS from the more than one neighboring synchronization sources as having a maximum reference signal received power (RSRP) detected by the UE. In step S1305, the UE would determine whether the RSRP of the first SS does not exceed a predefined threshold. If so, in step S1306, the UE would operate as a synchronization source, and in step S1307, the UE would transmit a second SS based on the first SS.

Figure 14:
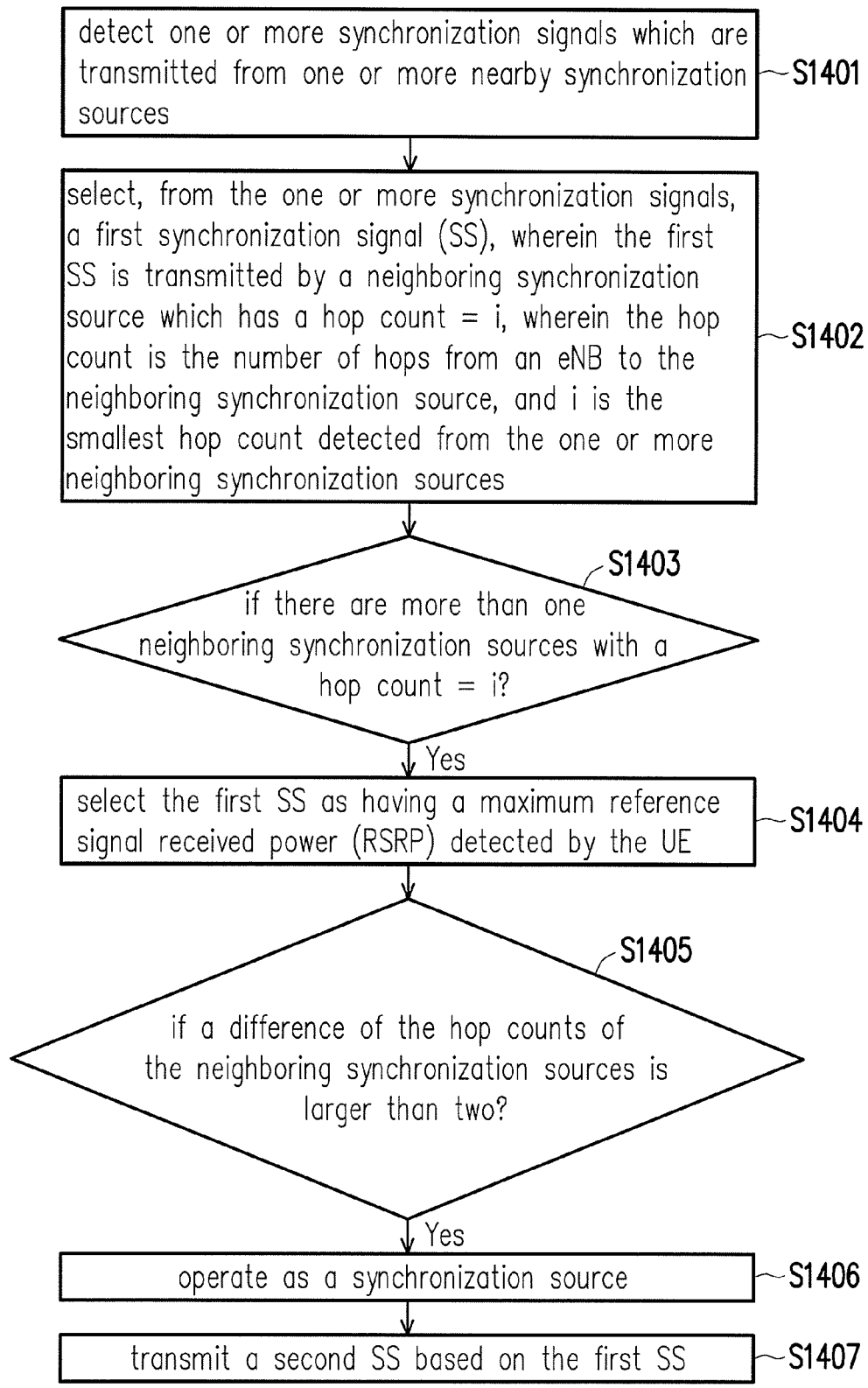
FIG. 14 is a flow chart which relates to the third exemplary embodiment of the disclosure.

FIG. 14 is a flow chart which relates to the third exemplary embodiment of the disclosure. In step S1401, the UE would detect one or more synchronization signals which are transmitted from one or more nearby synchronization sources. In step S1402, the UE would select, from the one or more synchronization signals, a first synchronization signal (SS), wherein the first SS is transmitted by a neighboring synchronization source which has a hop count=i, wherein the hop count is the number of hops from an eNB to the neighboring synchronization source, and i is the smallest hop count detected from the one or more neighboring synchronization sources. If step S1403, the UE would determine if there are more than one neighboring synchronization sources with a hop count=i. If so, in step S1404, the UE would select the first SS as having a maximum reference signal received power (RSRP) detected by the UE. In step S1405, the UE would determine if a difference of the hop counts of the neighboring synchronization sources is larger than two. If so, then in step S1406, the UE would operate as a synchronization source, and in step S1407 the UE would transmit a second SS based on the first SS.

Figure 15:
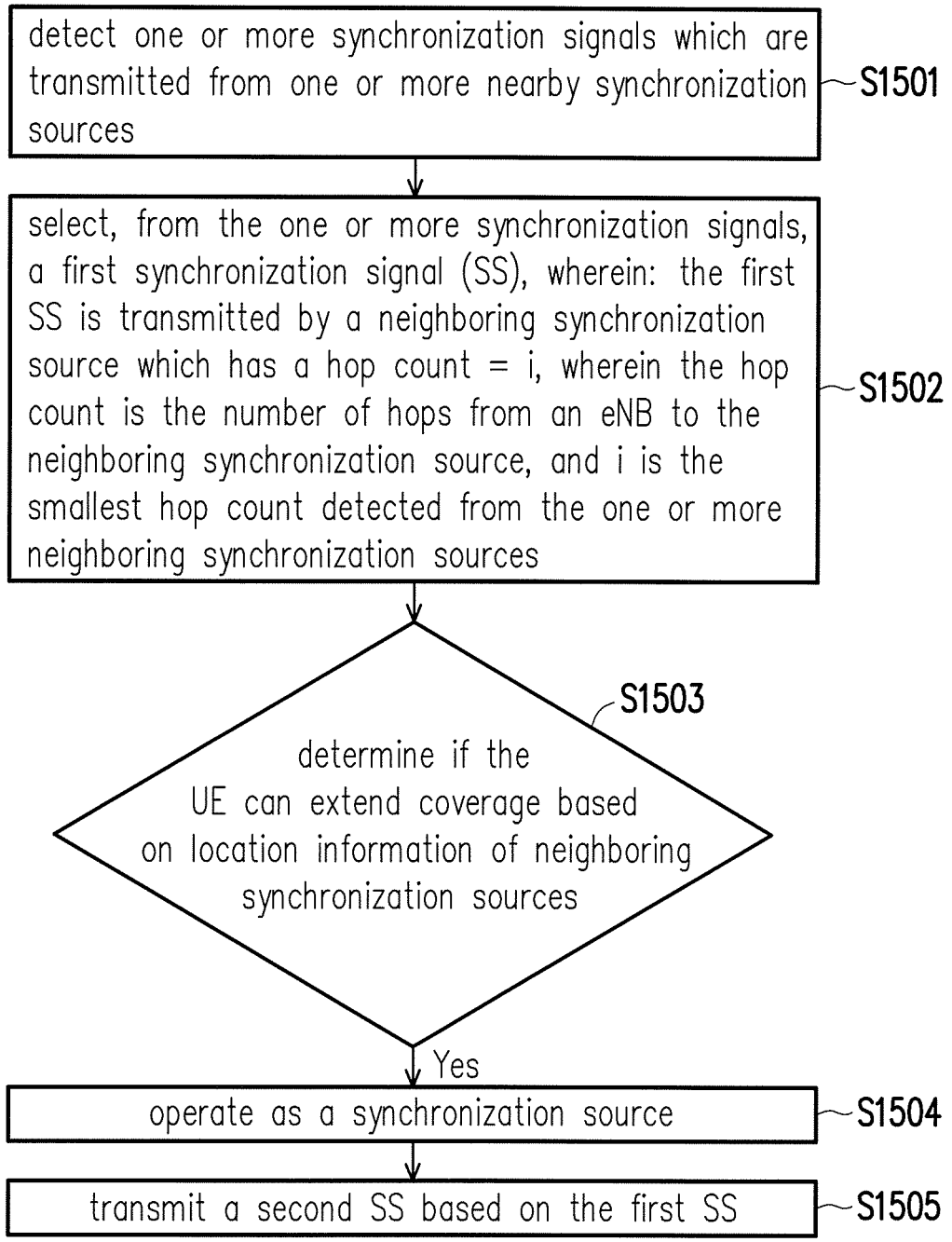
FIG. 15 is a flow chart which relates to the fourth exemplary embodiment of the disclosure.

FIG. 15 is a flow chart which relates to the fourth exemplary embodiment of the disclosure. In step S1501, the UE would detect one or more synchronization signals which are transmitted from one or more nearby synchronization sources. In step S1502, the UE would select, from the one or more synchronization signals, a first synchronization signal (SS), wherein: the first SS is transmitted by a neighboring synchronization source which has a hop count=i, wherein the hop count is the number of hops from an eNB to the neighboring synchronization source, and i is the smallest hop count detected from the one or more neighboring synchronization sources. In step S1503, the UE would determine if the UE can extend coverage based on location information of neighboring synchronization sources. If so, in step S1504, the UE would operate as a synchronization source, and in step S1505 the UE would transmit a second SS based on the first SS.

In view of the aforementioned descriptions, the present disclosure is suitable for being used in an N-hop synchronous wireless communication network and is able to provide synchronization to devices situated outside the coverage of the network, to extend the D2D wireless coverage of the synchronous network, to minimize the number of SYN sources, and to minimize propagation delay within a D2DSS coverage.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method of forming an N-hop synchronous network for device-to-device (D2D) communication, adapted for a user equipment (UE), the method comprising:
   detecting one or more synchronization signals which are transmitted from one or more nearby synchronization sources;
   selecting, from the one or more synchronization signals, a first synchronization signal (SS), wherein:
      the first SS is transmitted by a neighboring synchronization source which has a hop count=i, wherein the hop count is the number of hops from an eNB to the neighboring synchronization source, and i is the smallest hop count detected from the one or more neighboring synchronization sources; and
      if there are more than one neighboring synchronization sources with the hop count=i, the first SS is selected as having a maximum reference signal received power (RSRP) detected by the UE; and
   if the RSRP of the first SS does not exceed a predefined threshold:
      operating as a synchronization source; and
      transmitting a SS based on the first SS.

2. The method of claim 1 further comprising:
   if the RSRP of the first SS does exceed a predefined threshold, not operating as the synchronization source; and
   synchronizing to the first SS.

3. The method of claim 1, wherein the operating as the synchronization source further comprising:
   scanning for a second SS from a neighboring synchronization source which belongs to another N-hop synchronous network periodically; and
   transmitting a SS based on the second SS if the second SS has a higher priority than the first SS.

4. The method of claim 1, wherein the operating as the synchronization source further comprising:
   scanning for a primary SS (PSS) and a secondary SS (SSS) periodically;
   scanning for a third SS from a neighboring synchronization source which belongs to the same N-hop synchronous network periodically;
   transmitting a SS based on the PSS and the SSS if the PSS and the SSS are detected; and otherwise
   transmitting a SS based on the third SS if the third SS is detected and has higher priority than the first SS.

5. The method of claim 1, wherein the operating as the synchronization source further comprising:
   configuring the hop count of the UE to n if the UE transmits a SS based on another SS which is transmitted by a neighboring synchronization source having a lower hop count of n−1; and
   broadcasting the hop count periodically.

6. The method of claim 2, wherein the not operating as the synchronization source further comprising:
   scanning for a primary SS (PSS) and a secondary SS (SSS) periodically;
   scanning for a third SS from a neighboring synchronization source which belongs to the same N-hop synchronous network periodically;
   synchronizing to the PSS and the SSS if the PSS and the SSS are detected; and otherwise
   synchronizing to the third SS if the third SS is detected and has higher priority than the first SS.

7. The method of claim 1, wherein in response to losing the first SS, claim 1 further comprising:
   scanning for the one or more synchronization signals for a fixed period; and
   if the UE fails to detect the one or more synchronization signals during the fixed period:
      operating as a cluster head; and
      transmitting a SS without timing reference.

8. The method of claim 7, wherein the operating as the cluster head further comprising:
   scanning for a second SS from a neighboring synchronization source which belongs to another N-hop synchronous network periodically; and
   if the second SS has a higher priority than the UE:
      operating as the synchronization source; and
      transmitting a SS based on the second SS.

9. The method of claim 7, wherein the operating as the cluster head further comprising:
   scanning for a primary SS (PSS) and a secondary SS (SSS) periodically; and
   if the PSS and the SSS are detected:
      operating as the synchronization source; and
      transmitting a SS based on the PSS and the SSS.

10. The method of claim 7, wherein the operating as the cluster head further comprising:
    configuring the hop count of the UE to zero; and
    broadcasting the hop count periodically.

11. A method of forming an N-hop synchronous network for device-to-device (D2D) communication, adapted for a user equipment (UE), the method comprising:
    detecting one or more synchronization signals which are transmitted from one or more nearby synchronization sources;
    selecting, from the one or more synchronization signals, a first synchronization signal (SS), wherein:
       the first SS is transmitted by a neighboring synchronization source which has a hop count=i or i+1, wherein the hop count is the number of hops from an eNB to the neighboring synchronization source, and i is the smallest hop count detected from the one or more neighboring synchronization sources; and if there are more than one neighboring synchronization sources with the hop count=i or i+1, the first SS is selected as having a maximum reference signal received power (RSRP) detected by the UE; and if the RSRP of the first SS does not exceeds a predefined threshold:

operating as a synchronization source; and transmitting a SS based on the first SS.

12. The method of claim 11 further comprising:

if the RSRP of the first SS transmitted by the neighboring synchronization source which has a hop count=i or i+1 does exceed a predefined threshold, not operating as the synchronization source; and synchronizing to the first SS.

13. The method of claim 11, wherein the operating as the synchronization source further comprising:

scanning for a second SS from a neighboring synchronization source which belongs to another N-hop synchronous network periodically; and transmitting a SS based on the second SS if the second SS has a higher priority than the first SS.

14. The method of claim 11, wherein the operating as the synchronization source further comprising:

scanning for a primary SS (PSS) and a secondary SS (SSS) periodically;

scanning for a third SS from a neighboring synchronization source which belongs to the same N-hop synchronous network periodically;

transmitting a SS based on the PSS and the SSS if the PSS and the SSS are detected; and otherwise transmitting a SS based on the third SS if the third SS is detected and has higher priority than the first SS.

15. The method of claim 11, wherein the operating as the synchronization source further comprising:

configuring the hop count of the UE to n if the UE transmits a SS based on another SS which is transmitted by a neighboring synchronization source having a lower hop count of n−1; and broadcasting the hop count periodically.

16. The method of claim 12, wherein the not operating as the synchronization source further comprising:

scanning for a primary SS (PSS) and a secondary SS (SSS) periodically;

scanning for a third SS from a neighboring synchronization source which belongs to the same N-hop synchronous network periodically;

synchronizing to the PSS and the SSS if the PSS and the SSS are detected; and otherwise synchronizing to the third SS if the third SS is detected and has higher priority than the first SS.

17. The method of claim 11, wherein in response to losing the first SS, claim 11 further comprising:

scanning for the one or more synchronization signals for a fixed period; and if the UE fails to detect the one or more synchronization signals during the fixed period:

operating as a cluster head; and transmitting a SS without timing reference.

18. The method of claim 17, wherein the operating as the cluster head further comprising:

scanning for a second SS from a neighboring synchronization source which belongs to another N-hop synchronous network periodically; and if the second SS has a higher priority than the UE:

operating as the synchronization source; and transmitting a SS based on the second SS.

19. The method of claim 17, wherein the operating as the cluster head further comprising:

scanning for a primary SS (PSS) and a secondary SS (SSS) periodically; and if the PSS and the SSS are detected:

operating as the synchronization source; and transmitting a SS based on the PSS and the SSS.

20. The method of claim 17, wherein the operating as the cluster head further comprising:

configuring the hop count of the UE to zero; and broadcasting the hop count periodically.

21. A method of forming an N-hop synchronous network for device-to-device (D2D) communication, adapted for a user equipment (UE), the method comprising:

detecting one or more synchronization signals which are transmitted from one or more nearby synchronization sources;

selecting, from the one or more synchronization signals, a first synchronization signal (SS), wherein:

the first SS is transmitted by a neighboring synchronization source which has a hop count=i, wherein the hop count is the number of hops from an eNB to the neighboring synchronization source, and i is the smallest hop count detected from the one or more neighboring synchronization sources; and if there are more than one neighboring synchronization sources with a hop count=i, the first SS is selected as having a maximum reference signal received power (RSRP) detected by the UE; and if the RSRP of the first SS does not exceeds a predefined threshold or if a difference of the hop counts of the neighboring synchronization sources is larger than two:

operating as a synchronization source; and transmitting a SS based on the first SS.

22. A method of forming an N-hop synchronous network for device-to-device (D2D) communication, adapted for a user equipment (UE), the method comprising:

detecting one or more synchronization signals which are transmitted from one or more nearby synchronization sources;

selecting, from the one or more synchronization signals, a first synchronization signal (SS), wherein:

the first SS is transmitted by a neighboring synchronization source which has a hop count=i, wherein the hop count is the number of hops from an eNB to the neighboring synchronization source, and i is the smallest hop count detected from the one or more neighboring synchronization sources; and if the UE can extend coverage based on location information of neighboring synchronization sources or if a difference of the hop counts of the neighboring synchronization sources is larger than two:

operating as a synchronization source; and transmitting a SS based on the first SS.

23. A method of forming an N-hop synchronous network for device-to-device (D2D) communication, adapted for a user equipment (UE), the method comprising:

synchronizing to a first synchronization signal (SS);

performing a cyclic redundancy code (CRC) check for data packets received from one or more nearby UEs;

scanning for a second SS transmitted from a neighboring synchronization source which belongs to another N-hop synchronous network in response to an error rate of the CRC check exceeding an error rate threshold;

if the second SS has a higher priority than the first SS:

operating as the synchronization source; and transmitting a SS based on the second SS; and
if the second SS has a lower priority than the first SS:
   operating as the synchronization source; and
   transmitting a SS based on the first SS.

\* \* \* \* \*